United States Patent
Hoshizaki et al.

[11] Patent Number: 5,908,530
[45] Date of Patent: Jun. 1, 1999

[54] APPARATUS FOR CHEMICAL MECHANICAL POLISHING

[75] Inventors: Jon A. Hoshizaki, Cupertino; Roger O. Williams, Fremont; James D. Buhler, Shingle Springs; Charles A. Reichel, Fremont; William K. Hollywood, San Carlos; Richard De Geus, Cupertino; Lawrence L. Lee, Mountain View, all of Calif.

[73] Assignee: Obsidian, Inc., Fremont, Calif.

[21] Appl. No.: 08/443,956

[22] Filed: May 18, 1995

[51] Int. Cl.$^6$ ............................................ B24B 37/00
[52] U.S. Cl. .................... 156/345; 451/170; 451/272; 451/287
[58] Field of Search .................... 156/345, 636.1; 216/88, 89; 451/287, 164, 162, 170, 108, 288, 264, 265, 272, 283, 173, 259

[56] References Cited

U.S. PATENT DOCUMENTS

| | | | |
|---|---|---|---|
| 1,577,137 | 3/1926 | Maynard | 451/291 |
| 3,518,798 | 7/1970 | Boettcher | 451/288 |
| 3,667,661 | 6/1972 | Farmer | 225/2 |
| 3,730,410 | 5/1973 | Altshuler | 225/96.5 |
| 3,906,678 | 9/1975 | Roth | 451/317 |
| 4,282,924 | 8/1981 | Faretra | 118/500 |
| 4,313,284 | 2/1982 | Walsh | 451/288 |
| 4,344,160 | 8/1982 | Gabriel et al. | 367/96 |
| 4,425,038 | 1/1984 | La Fiandra et al. | 355/73 |
| 4,508,161 | 4/1985 | Holden | 118/50 X |
| 4,793,895 | 12/1988 | Kaanta et al. | 156/636.1 X |
| 4,930,262 | 6/1990 | Sennewald | 451/283 X |
| 4,954,142 | 9/1990 | Carr et al. | 51/309 |
| 5,036,630 | 8/1991 | Kaanta et al. | 451/41 |
| 5,193,316 | 3/1993 | Olmstead | 451/41 X |
| 5,205,082 | 4/1993 | Shendon et al. | 451/41 |
| 5,230,184 | 7/1993 | Bukham | 451/41 |
| 5,232,875 | 8/1993 | Tuttle et al. | 437/225 |
| 5,267,418 | 12/1993 | Currie et al. | 451/364 |
| 5,335,453 | 8/1994 | Baldy et al. | 451/41 X |
| 5,352,249 | 10/1994 | Vollaro | 29/25.01 |
| 5,377,451 | 1/1995 | Leoni et al. | 451/287 |
| 5,476,548 | 12/1995 | Lei et al. | 118/728 |
| 5,487,697 | 1/1996 | Jensen | 451/324 |
| 5,582,534 | 12/1996 | Shendon et al. | 451/41 |

FOREIGN PATENT DOCUMENTS

| | | |
|---|---|---|
| 0047720 | 3/1982 | European Pat. Off. . |
| 0 674 972 A1 | 10/1995 | European Pat. Off. . |
| 0 747 167 A2 | 12/1996 | European Pat. Off. . |
| 1224972 | 6/1960 | France . |
| 8-39422 | 2/1996 | Japan . |
| 8-153692 | 11/1996 | Japan . |
| 2077459 | 12/1981 | United Kingdom . |

*Primary Examiner*—Thi Dang
*Attorney, Agent, or Firm*—Morrison & Foerster, LLP

[57] ABSTRACT

An apparatus for polishing wafers, preferably by chemical mechanical polishing. The apparatus includes a table defining a planar polishing surface adapted to contain a polishing medium and a wafer carrier assembly adapted to hold a wafer against the polishing surface. The wafer carrier assembly includes a wafer carrier and prevents rotation of the wafer carrier with respect to the polishing table even when the wafer carrier is moved in a circular or orbital path on the polishing surface. Polishing is carried out relative movement between the wafer carrier and the polishing surface in any direction within the plane of the polishing surface. The relative movement can be accomplished by moving the wafer carrier, the polishing table, or a combination of movements of the wafer carrier and polishing table.

25 Claims, 15 Drawing Sheets

APPARATUS FOR CHEMICAL MECHANICAL POLISHING

BACKGROUND OF THE INVENTION

1. Technical Field

The present invention relates to the polishing of semiconductor wafers of the type from which chips for integrated circuits and the like are made. More specifically in a chemical mechanical process (CMP) a semiconductor wafer is held by a tooling head and is polished by contact with an abrasive material in a controlled chemically active environment.

2. Discussion of the Related Art

As part of the manufacturing process of semiconductor devices, semiconductor wafers are polished by CMP. The uniform removal of material from and the planarity of patterned and un-patterned wafers is critical to wafer process yield. Generally, the wafer to be polished is mounted on a tooling head which holds the wafer using a combination of vacuum suction or other means to contact the rear side of the wafer and a retaining lip or ring around the edge of the wafer to keep the wafer centered on the tooling head. The front side of the wafer, the side to be polished, is then contacted with an abrasive material such as an abrasive pad or abrasive strip. The abrasive pad or strip may have free abrasive fluid sprayed on it, may have abrasive particles affixed to it, or may have abrasive particles sprinkled on it.

The ideal wafer polishing process can be described by Preston's equation: $R=K_p*P*V$, where R is the removal rate; Kp is a function of consumables (abrasive pad roughness and elasticity, surface chemistry and abrasion effects, and contact area); P is the applied pressure between the wafer and the abrasive pad; and V is the relative velocity between the wafer and the abrasive pad. As a result, the ideal CMP process should have constant cutting velocity over the entire wafer surface, constant pressure between the abrasive pad and wafer, and constant abrasive pad roughness, elasticity, area and abrasion effects. In addition, control over the temperature and Ph is critical and the direction of the relative pad/wafer velocity should be randomly distributed over the entire wafer surface.

Most current CMP machines fail to produce constant velocity distribution over the entire wafer surface which is necessary for uniform material removal and good flatness. One common type of wafer polishing apparatus is the CMP model 372M made by Westech Systems Inc. As shown in simplified form in FIG. 1, a wafer 100 is held by a tooling head 102 which rotates about the axis of the wafer. A large circular abrasive pad 104 is rotated while contacting the rotating wafer and tooling head. The rotating wafer contacts the larger rotating abrasive pad in an area away from the center of the abrasive pad. Thus in the Westech apparatus, the relative motion between the wafer and the abrasive pad has two components: one due to the rotating wafer and another due to the rotating abrasive pad.

A number of disadvantages result from the relative motion between the wafer and the abrasive pad in the Westech apparatus. According to Preston's equation the rate at which material is removed from a given point on the wafer is directly proportional to the relative velocity between that point and the abrasive pad. In the Westech apparatus, different points on the wafer see different relative abrasive pad velocities, and therefore have different removal rates. The non-uniform relative velocities result from the fact that the velocity near the center of a rotating circle is less than the velocity near the outside of the circle. For example, while the center of the rotating wafer sees a constant velocity which is related solely to the rotating abrasive pad, the outer points of the wafer see velocities which are a combination of the rotating tooling head and the rotating abrasive pad.

Not only does the Westech apparatus result in non-uniform velocities at different points of the wafer at any one time, the velocities of points away from the center tend to fluctuate significantly over time. Constant velocities are preferable to fluctuating velocities since the removal rate and other factors necessary in obtaining a smooth finish are much easier to control. For example, with the Westech system, points away from the center of the wafer see alternating high and low velocities. During a period of low velocity, the abrasive material may pit or scratch the surface of the wafer and result in a non-smooth surface.

Another related apparatus is a polishing machine for polishing semiconductor wafers containing magnetic read-write heads, disclosed in U.S. Pat. No. 5,335,453 to Baldy et al. With this machine, a semiconductor wafer is held by a support head which is moved in a circular translatory motion by an eccentric arm. The wafer is polished by contacting an abrasive strip which is advanced in one direction. The relative motion between the wafer and the abrasive strip is a combination of the circular motion of the wafer and the linear motion of the advancing abrasive strip. The resulting relative motion is that of a circle precessing in a straight line. Note that "precessing" used herein refers to the movement in a plane of an axis which is perpendicular to the plane and about which a circular translation occurs.

While the precessing circle polishing pattern that this apparatus provides should provide more uniform velocities such that different points on the wafer see similar velocities at any given time, the velocities are still not constant. Assuming the rotation of the eccentric arm is held to a constant angular speed, the precessing circle relative motion results in fluctuating velocities. When the wafer is rotating away from the precessing direction the net relative velocity is lower, and when the wafer is rotating with precessing direction the net relative velocity is higher.

Moreover, the apparatus has the disadvantage of not being able to provide alternative polishing patterns. Since the support head is mounted on a rotating eccentric arm, the wafer can only be polished by moving in a circle. Polishing patterns other than circular are desired for a number of reasons.

One such reason is to provide more uniform wear of the abrasive pad. Non-uniform wear of the abrasive pad results in a non-uniform removal rate of wafer material since more heavily worn sections of the abrasive pad remove material at a lower rate. Non-uniform wear also results in less efficient use of the abrasive pad itself, since the pad must be changed more often or advanced at a faster rate in order to avoid using portions of the pad which wear out first.

A relative polishing motion of a circle precessing in a straight line results in the center of the abrasive strip having more wear than the outside edges. This is because the wafer spends more time in the center of the pad than at the outer edges. The more time the wafer spends on certain sections of the abrasive strip, the more the abrasive strip wears out.

Another disadvantage of circular patterns is uncontrolled spinning of the wafer inside the tooling head. The forces from the polishing motion in a continuous circular motion cause the wafer to tend to spin or rotate in one direction with respect to the tooling head.

An additional disadvantage of only providing a circular pattern is that certain topologies on the wafer surface may be less well suited for circular polishing patterns. The pre-polishing topology of the surface of the wafer may be patterned, due to processing. Each surface topology is optimally planarized by a certain polishing pattern, which may not always be a circular one. Thus, providing the ability to custom design polishing patterns is desirable so that polishing different surface topologies may be optimized.

Another disadvantage with prior systems is that it is difficult or impossible to polish selected regions of the wafer using a specific portion of an abrasive pad. For example, if a zone of aggressive abrasive is present on the abrasive pad, it is difficult to selectively use that zone to increase the removal rate on certain parts of the wafer, if the only motion provided by the polishing system is that of a fixed radius circle.

Another disadvantage with prior systems is related to the fact that a wafer moving in a particular direction will have a higher removal rate on the leading edge and sides of the wafer. Prior art systems providing only certain polishing patterns cannot be easily made to control the removal rates at the edges due to this effect. Circular motion generally provides a constantly variable cutting direction and therefore will cause removal rates from all the edges. However, prior art systems cannot be programmed so that certain areas are selectively polished by spending more time traveling in one direction than another.

While Preston's equation, explained above, describes the ideal process, it does not address some factors related to a manner in which the wafer is presented to the polishing media and chemistry. Many CMP machines currently available yield wafers bearing anomalies in planarity. These anomalies are often related to factors that cannot be described by Preston's equation. For example, it has been found with many available CMP machines, that the removal rates of material are higher near the edges of the wafer. The shape of the platen (which holds the wafer against the polishing media) and the relationship between the platen and the retaining ring (which keeps the wafer centered on the platen) are crucial to the final wafer planarity.

One attempt at addressing some of the problems not described by Preston's equation is described in U.S. Pat. No. 5,205,082 to Shendon et al. Disclosed is an attempt to control the relationship between the platen, ring and pad by tying the platen and the ring together through a flexible diaphragm. However, by allowing the ring to float with respect to the platen, the ring can be upset by changes in abrasive pad flatness, roughness, and friction. When the ring is disturbed, the pressure on the periphery of the wafer increases. This can contribute to poor planarity because of more pronounced oxide removal rates near the wafer edges.

Another type of tooling head, described in U.S. Pat. No. 4,954,142 to Carr et al., uses a retaining ring with constant pressure at all points on the ring. The pressure on the ring is not adjustable during polishing, in that different springs must be used for any variation in conditions, such as changes in the abrasive pad surface. Changing springs requires disassembly of the retaining ring from the head. Thus there is a need for a tooling head having a retaining ring in which the pressure between the ring and the abrasive pad is easily adjustable, and less prone to changes in the abrasive pad surface.

Other problems with tooling heads include undesirable chattering or vibration during certain polishing patterns. Chattering or vibration is caused by allowing a certain degree of backlash, or play between the tooling head and its supporting member in directions parallel to the wafer being polished.

SUMMARY OF INVENTION

Thus it is an object of the present invention to provide an apparatus which polishes wafers while maintaining uniform relative velocity at all points on the wafer relative to the abrasive pad.

It is also an object of the present invention to provide an apparatus which polishes wafers while maintaining uniform average velocity between the wafer and the abrasive pad.

It is a further object of the invention to provide an apparatus which polishes wafers while providing uniform wear of the abrasive pad.

It is a further object of the invention to provide an apparatus which polishes wafers while controlling the rotation of the wafer inside the tooling head, thus minimizing deformation or breakage of the wafers.

It is a further object of the invention to provide an apparatus which polishes wafers by offering the user alternative polishing patterns.

It is a further object of the invention to provide a more effective tooling head which has the capability of reducing problems of poor planarity.

It is a further object of the invention to provide a more effective tooling head which does not allow backlash and thus prevents undesirable chattering or vibration during polishing.

In order to meet these objectives, the present invention is directed to an apparatus for polishing a semiconductor wafer which includes a table having a polishing medium fixedly attached to its surface and being movable in directions parallel to the surface of the table. A controller is provided for controlling the motion of the table according to a predetermined polishing pattern. The polishing pattern preferably maintains a constant velocity between the wafer and the abrasive medium, and consists of a series of arc shaped paths.

The wafer is held in place and in contact with the abrasive pad by a tooling head which includes a circular platen and a retention ring peripherally oriented about the outer edge of the platen. The retention ring is mounted and positioned to resist lateral forces on the wafer caused by engagement of the face of the wafer with the polishing surface. An adjustable coupling is mounted to the platen and the ring, and serves to adjustably position during polishing the height of the ring relative to the face of the wafer as well as to rigidly support during polishing the position of the retaining ring.

A flexible disk is fixedly mounted between a support post and the platen and oriented substantially parallel to the face of the platen. The flexible disk is adapted to prevent rotation of the platen about the axis of the support post and to transmit forces between the platen and the post in directions parallel to the face of the platen.

Additionally, a cavity is defined by the platen, wall member, and top plate. A port and a pressure regulator are used to introduce gas or liquid into the cavity at positive or negative pressures. The pressure in the cavity causes the platen to deform, thus deforming the wafer to affect the polishing characteristics as desired by the user.

DETAILED DESCRIPTION OF THE INVENTION

Figure 1:
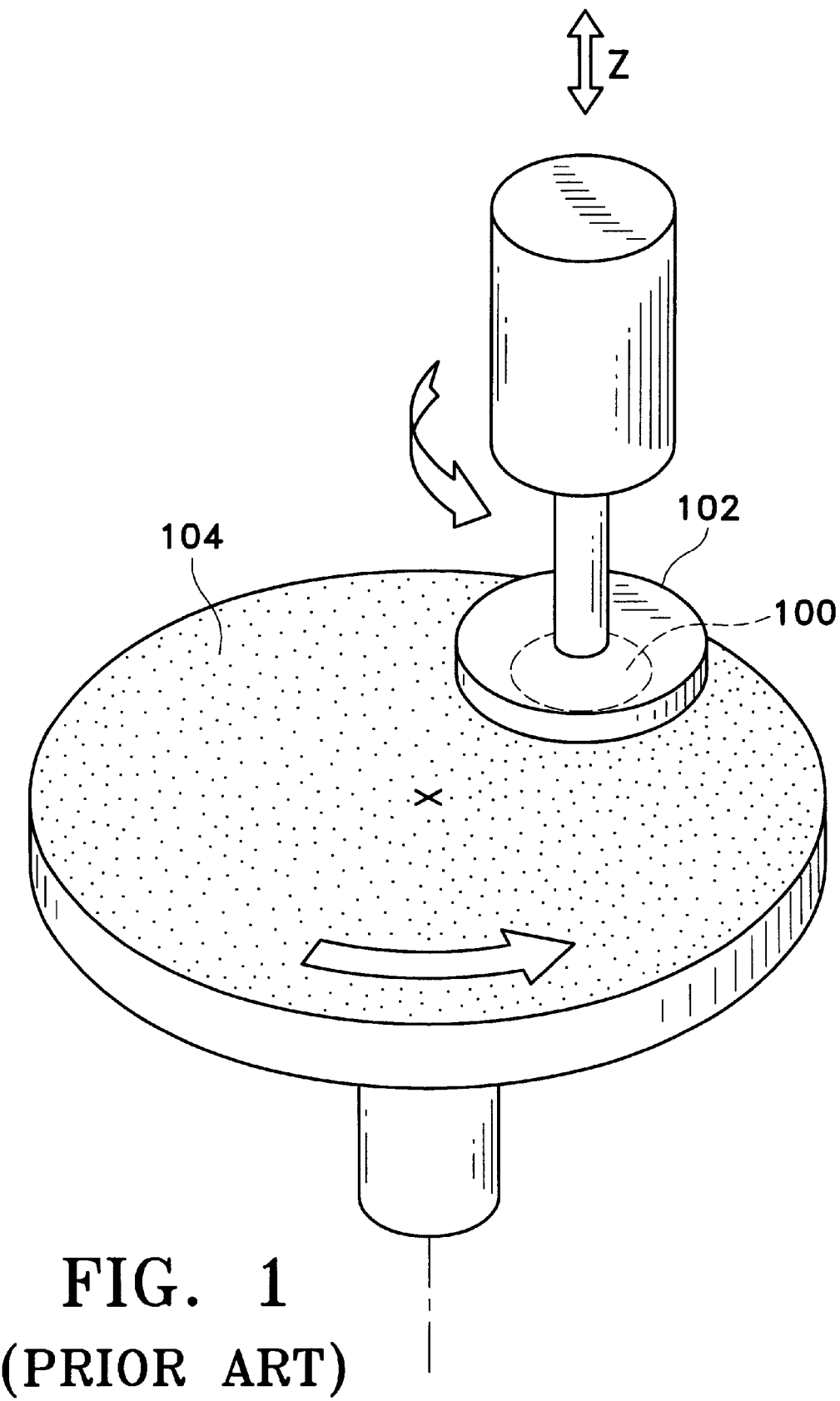
FIG. 1 is a simplified prospective view of a prior art CMP system.

The following embodiments of the present invention will be described in the context of a method and apparatus for polishing semiconductor wafers, although those skilled in the art will recognize that the disclosed methods and structures are readily adaptable for broader application. For example, the invention is readily adaptable for use in processing other types of disk shaped objects. Note that whenever the same reference numeral is repeated with respect to different figures, it refers to the corresponding structure in each such figure.

Figure 2:
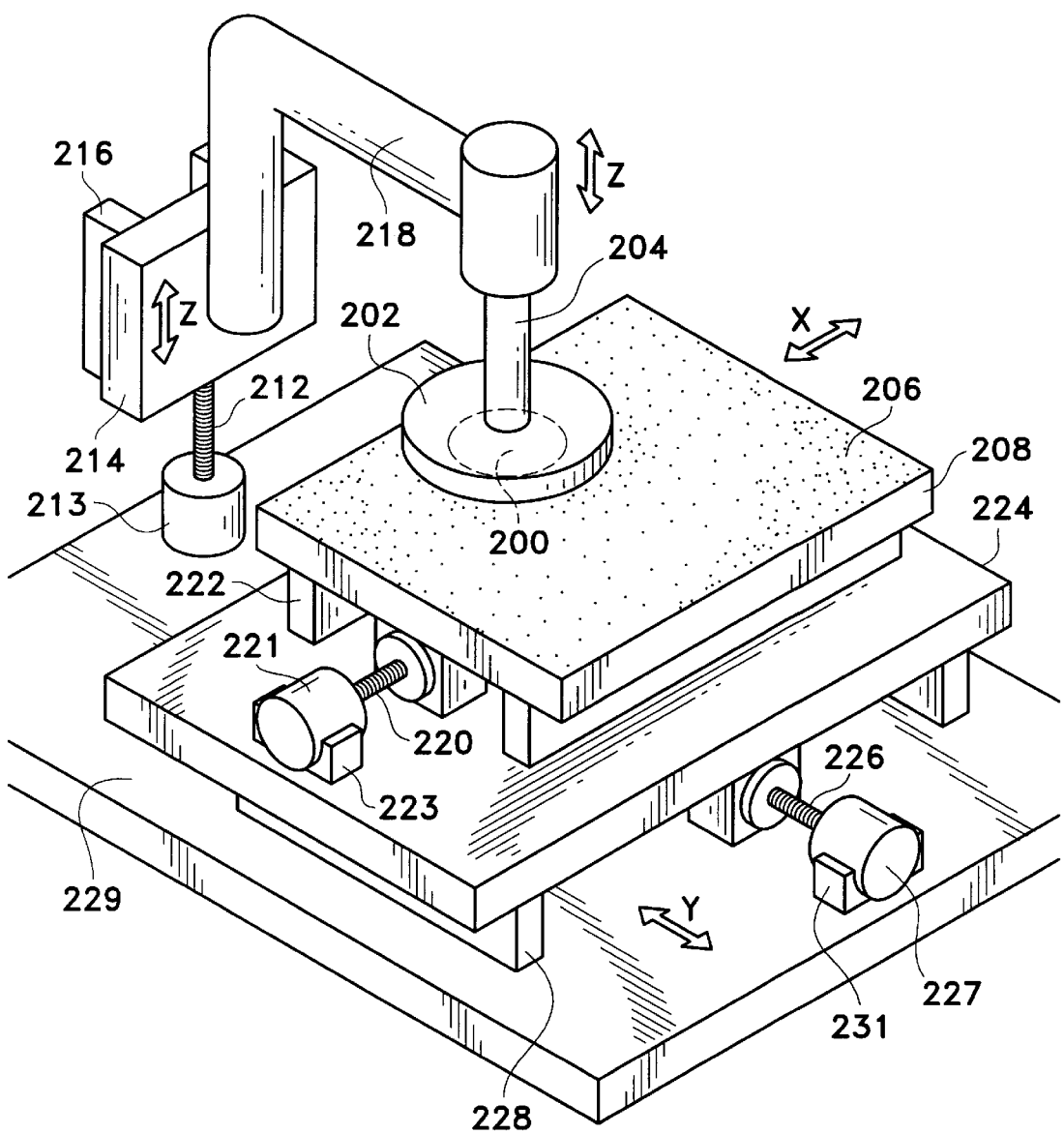
FIG. 2 is a front prospective view of a polishing apparatus according to the present invention.

A method and apparatus for polishing semiconductor wafers according to the present invention is illustrated in FIG. 2. The rear side of wafer 200 is held by tooling head or wafer carrier 202, while the front side of wafer 200 is contacted by abrasive pad 206. Wafer carrier 202 is connected to a post 204 which may move tooling head or wafer carrier 202 and wafer 200 in the Z-direction, which is perpendicular to the plane of wafer 200, so that wafer 200 may be brought into contact with abrasive pad 206. Post 204 may also apply polishing force in the Z-direction on wafer carrier 202 and wafer 200. The Z-direction movement and force applied to tooling head 202 is provided by a servo. In this embodiment of the invention, the servo includes a lead screw 212, which pushes a plate 214 attached to a linear slide 216. Cross-member 218 is fastened to plate 214 and also to post 204. According to a preferred embodiment of the invention lead screw 212 is driven by an electric motor 213 mounted to base 229 and which is computer controlled so that the user may program the force applied during the polishing process. One skilled in the art will realize that other methods providing Z-direction movement and force are practicable.

Post 204 and tooling head 202 hold wafer 200 in a substantially fixed position in X and Y-directions, which are parallel to the plane of wafer 200 and perpendicular to each other. According to this embodiment of the invention, tooling head 202 and wafer 200 do not rotate about an axis perpendicular to and passing through the center of wafer 200.

Table 208 is movable in both the X and Y-directions. According to a preferred embodiment of the invention, table 208 is movable in the X-direction by action of lead screw 220 and linear slide 222. Similarly table 208 is movable in the Y-direction by being mounted on plate 224 which is mounted to linear slide 228 and actuated by lead screw 226. Note that linear slide 228 is also mounted to base 229. In a preferred embodiment of the invention, lead screws 220 and 226 are driven by infinitely positionable electric motors 221 and 227 which are mounted to plate 224 and base 229 using brackets 223 and 227 respectively. Motors 221 and 227 are preferably computer controlled so that the user may program the table to move in an infinite number of patterns.

While lead screws are used in the presently preferred embodiment of the invention, one skilled in the art would recognize that other servo means would be practicable, for example a rack-and-pinion servo means.

Figure 3:
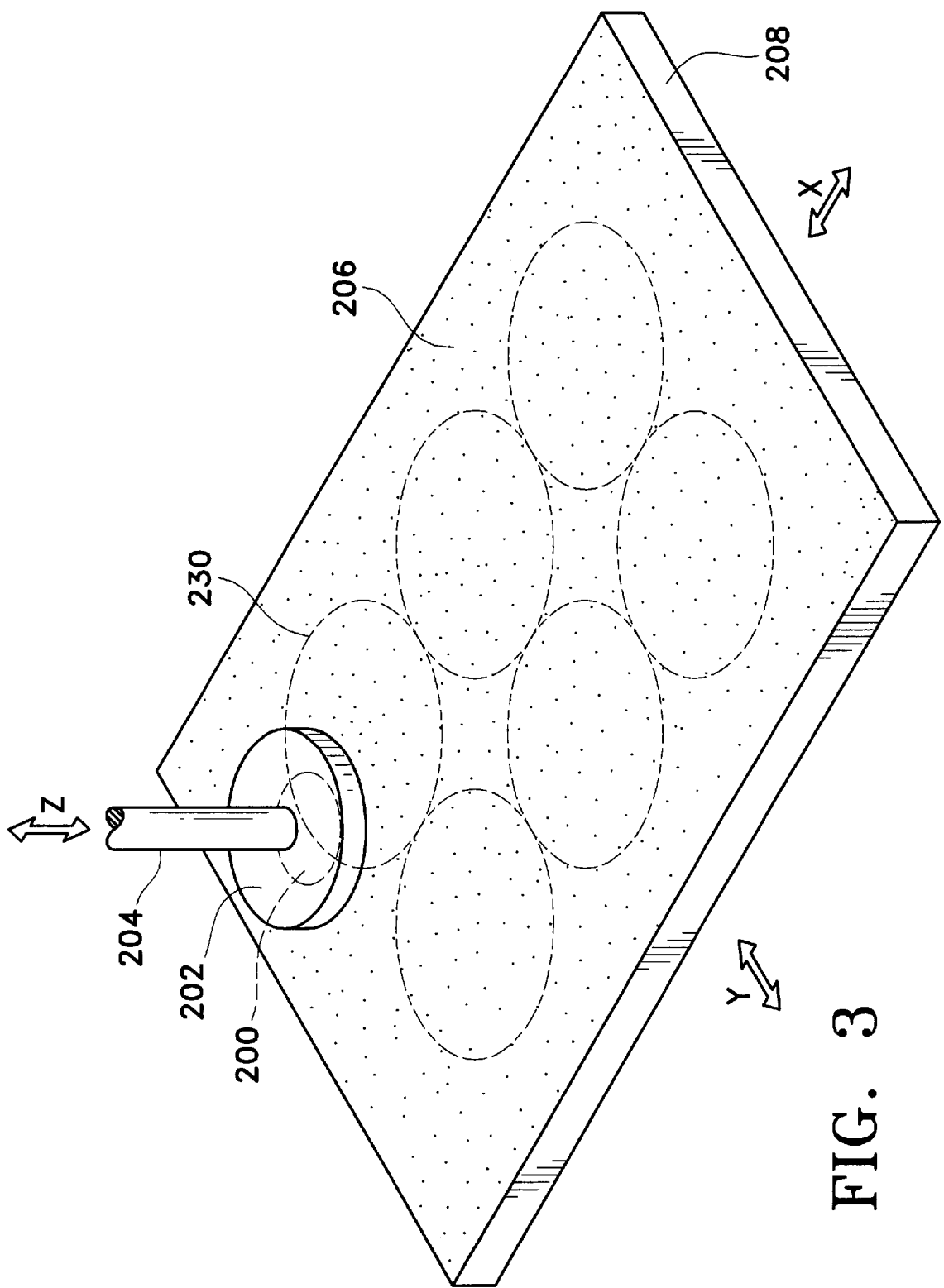
FIG. 3 is a front prospective view of a tooling head, an abrasive pad, and a table according to the present invention.

Movements of table 208 in the X and Y-directions while holding wafer 200 and tooling head 202 fixed in the X and Y-directions result in relative motion between the wafer 200 and abrasive pad 206. Shown in FIG. 3 is an example of a polishing pattern 230, which is in this case a series of tangent circles. The pattern shows a path traced by the center of wafer 200 as the abrasive pad 206 is moved beneath it.

Note that since wafer 200 does not rotate with respect to abrasive pad 206, all points on the wafer experience the same relative velocity with respect to the abrasive pad. Providing uniform relative velocity for all points on the wafer advantageously provides a more uniform removal rate of material from the wafer when compared to prior art systems where the wafer rotates.

In the system described according to the present invention, the user may program the movement of the abrasive pad and table such that the relative velocity of the wafer with respect to the abrasive pad is constant at all times. Constant velocity of the wafer is desirable since it results in more predictable material removal rates than non-constant velocity polishing patterns.

Figure 9:
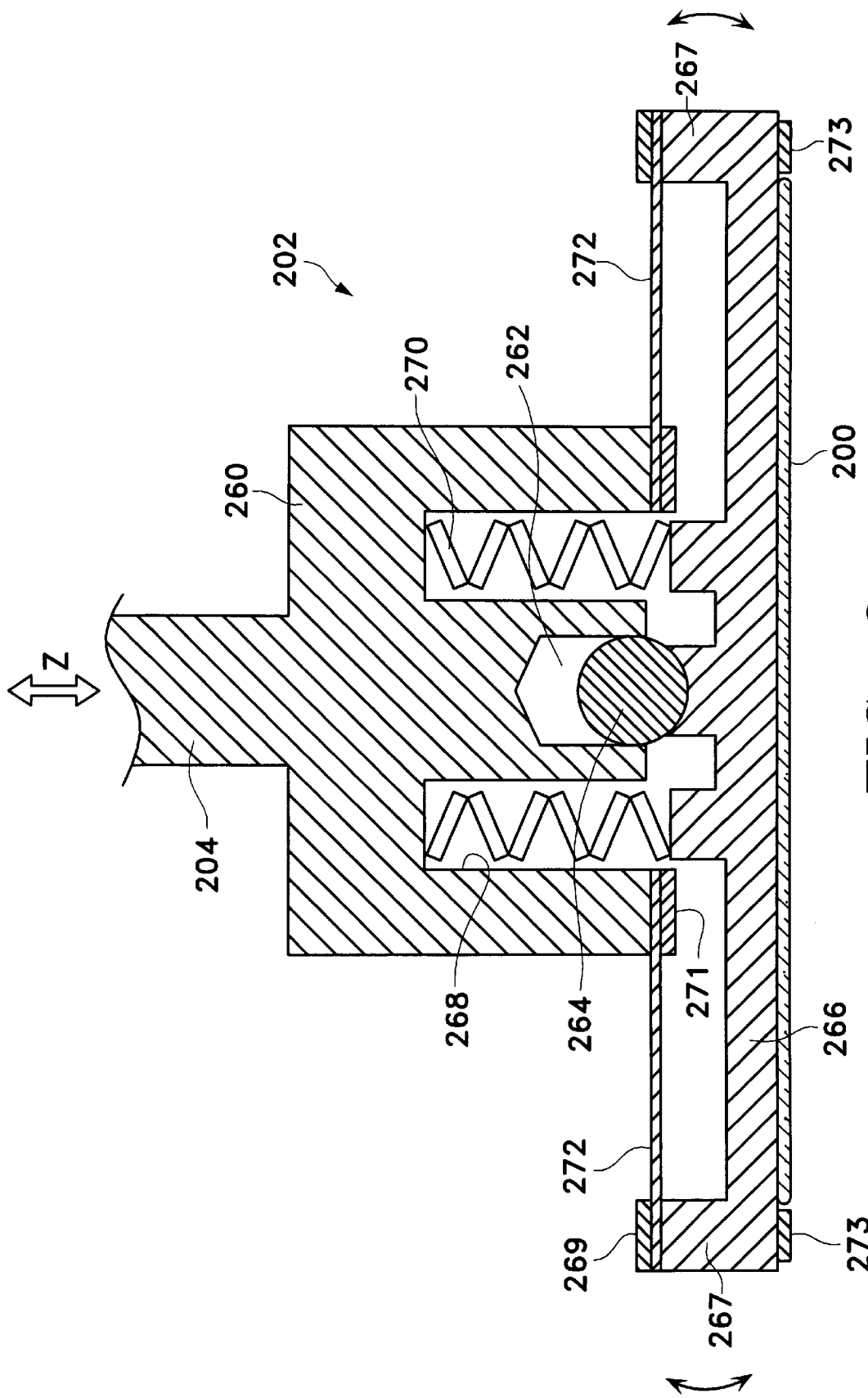
FIG. 9 is a side view cross-section of a tooling head, according to the present invention.

According to a preferred embodiment of the invention, force between the wafer and the abrasive pad is controlled by compression springs which reside in tooling head 202 (shown in FIG. 9). Since the tooling head is moveable in the Z-direction, under computer control, the user is free to program the force applied between the wafer and abrasive pad in order to improve slurry or cutting fluid distribution and cutting efficiency. For example, a variable force applied during polishing may in some cases improve polishing results.

Note that since abrasive pad 206 is fixedly attached to table 208, a higher force may be applied between the wafer and pad than is possible with prior art systems using an advancing movable abrasive tape. By fixing the abrasive pad to the table, the force of the head pushing down on the tape in the Z-direction helps retain the tape in place. In contrast, with systems using advancing tape abrasive the force of the head pushing down on the tape must be overcome in order to advance the tape. Thus with advancing tape systems a lower force must be applied in the Z-direction to maintain a flat tape surface and to prevent tearing. Moreover, with advancing tape systems, the abrasive tape has a greater tendency to stretch, pucker or deform under the great forces subjected to it during operation. Such deformations and stretching cause less consistency in the velocity of the tape speed, and, as a result, less consistent relative velocity between the tape and wafer.

Since the system according to the present embodiment uses an abrasive pad affixed to the table, and the table is moved by infinitely positionable motors with a lead screw drive, very accurate and consistent velocity can advantageously be achieved.

Figure 4:
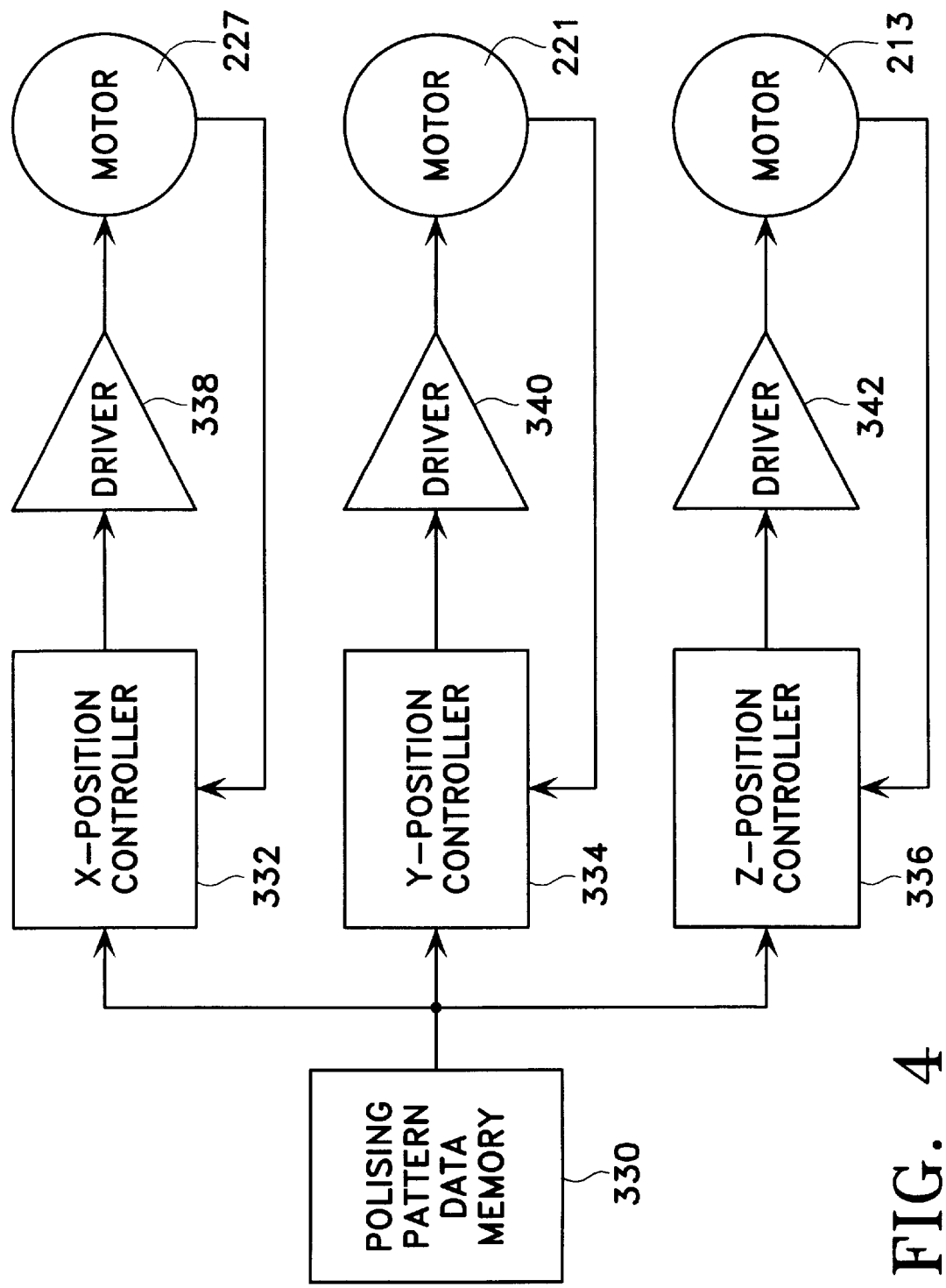
FIG. 4 is a block diagram illustrating control circuitry according to a preferred embodiment of the present invention.

FIG. 4 is a block diagram illustrating in simplified form the control circuitry according to a preferred embodiment of the invention. Polishing pattern data memory 330 contains position information of table 206 in the X and Y-directions, and tooling head 202 and post 204 in the Z-direction according to a predetermined polishing pattern. The pattern data is received by the X, Y, and Z position controllers 332, 334, and 336. The position controllers compute the change in position required using both the position data from memory 330 and feedback information from the electronic motors. The change in position data is sent to motor drivers 338, 340, and 342, which use the received information to drive motors 227, 221 and 213. Preferably position encoders are provided on the motors or elsewhere which send position feedback to the position controllers. One of ordinary skill in the art may select the components needed for the control circuitry from many which are commercially available.

If uniform removal of material is desired, care must be taken in programming a particular polishing pattern so that the cut angle and leading edge of the wafer are sufficiently varied. The cut angle refers to the direction of relative movement that a point on the wafer sees with respect to the abrasive pad. If the cut angle is not sufficiently varied, grooves may be cut in the surface of the wafer.

Similarly, the leading edge of the wafer should be sufficiently varied during the polishing process, since the leading edge of the wafer experiences a higher rate of material removal. If the leading edge of the wafer is not varied sufficiently, non-uniform removal rates from different parts of the wafer may result. It has been found that circular and arc polishing patterns provide sufficient variations in both cut angles and leading edges of the wafer.

Thus, according to this embodiment of the present invention, a wafer polishing machine is provided which allows the user to program any polishing pattern desired. The user is not confined to a fixed polishing pattern, such as a fixed radius circle precessing in a straight line as in prior art systems. With the current system, for example, the user may program the pattern to be a circle with a different radius. Rather than precessing in a straight line the user may choose a sine wave, a larger circle, or any combination of arcs, curves, or straight lines. The user may also program any of the precessing patterns to move in a "FIG. 8" pattern instead of a circle.

The advantages of providing a wide variety of programmable polishing pattern are numerous. As discussed above, the user may program the relative wafer to pad velocity to be constant, as opposed to prior systems where the velocity fluctuates. The user may also program the pattern such that detrimental effects of spinning or rotating of the wafer with respect to the tooling head is minimized. For example, the user may program a circular polishing pattern in which the direction of rotation is reversed at intervals such that the wafer does not spin in the tooling head significantly in one direction.

Another advantage of providing a wide variety of alternative polishing patterns is that particular topologies on the surface of the wafer may be better planarized by selecting a more optimal polishing pattern.

Another advantage of providing a wide variety of alternative polishing patterns is the ability to take advantage of regions of the abrasive pad which have a more aggressive abrasive. The user may program the pattern such that selected portions of the wafer are polished by the more aggressive abrasive regions in order to increase removal rate from those portions. Similarly, if certain regions of the abrasive pad are less abrasive, the user may program the polishing pattern such that the less abrasive region is either avoided, or passed over uniformly so that an even removal rate is still obtained.

Another advantage of the described system is that the user may program the polishing pattern to selectively remove more material from certain edges of the wafer by programming the pattern such that those edges are more frequently leading in the polishing pattern.

Another advantage is that the user may program the polishing pattern such that uniform wear of the abrasive pad is achieved. According to a preferred embodiment uniform abrasive pad wear has been attained by polishing in a pattern of continuous arcs which together form a series of tangent circles.

Figure 5:
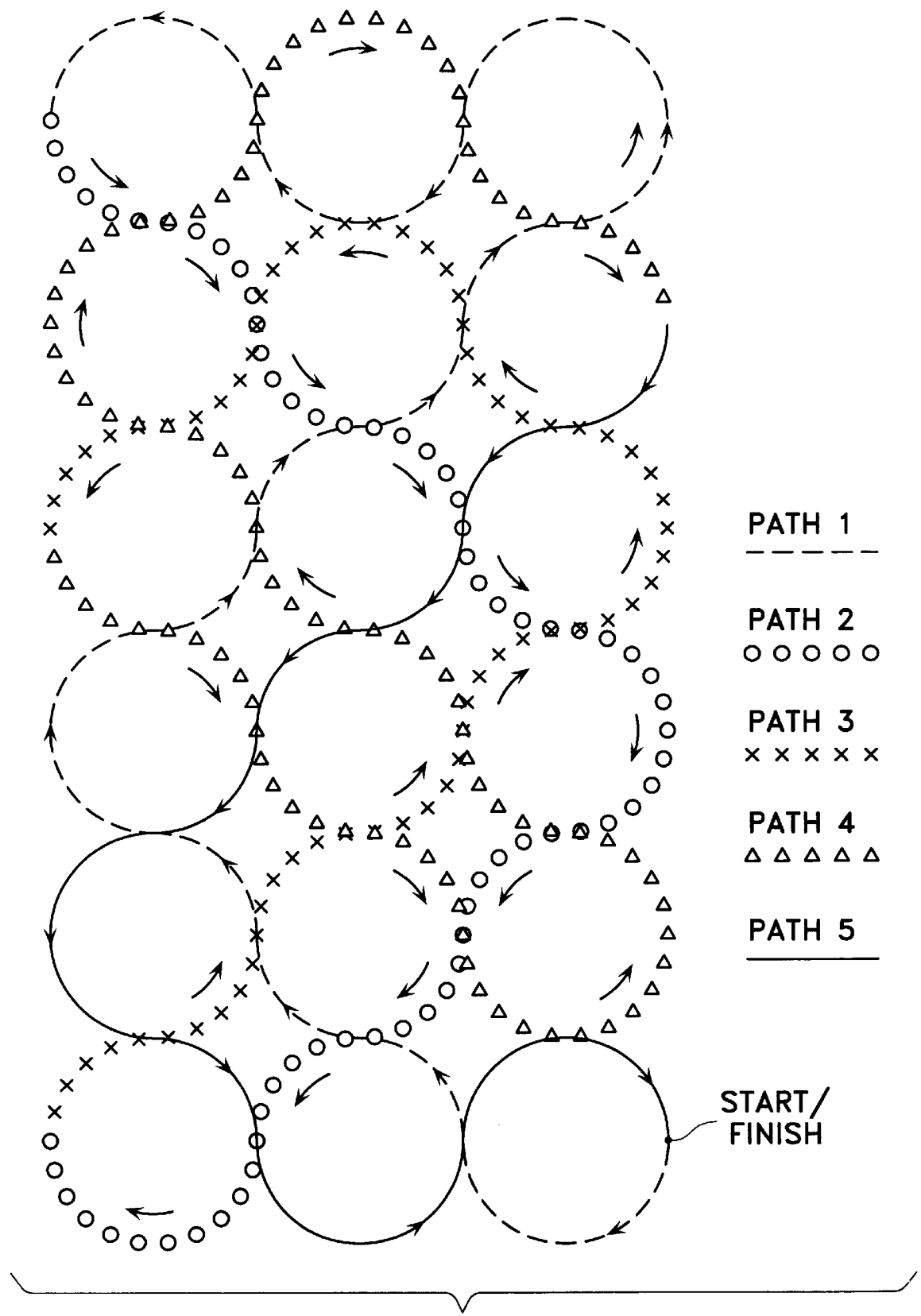
FIG. 5 is a top view of a polishing pattern according to the present invention.

FIG. 5 shows an example of one continuous arc polishing pattern. The continuous arc pattern shown comprises a series of arcs traced out by the center of a wafer being polished such that a series of tangent circles is drawn. Paths 1 to 5 are shown with different lines so that the reader may more easily follow the path of the wafer on the abrasive pad. In practice, the center of the wafer moves continuously from one path to the next, while maintaining a constant velocity during the polishing process.

The continuous arc pattern shown in FIG. 5 has been found to provide an extremely good polishing result for a number of reasons. Pad wear is uniform, since the wafer covers a large area in a uniform manner prior to repeating the pattern. The cut angle and leading edge of the wafer is continuously varied since the wafer is continuously in an arc motion. Uniform velocity is attained at all points on the wafer since the wafer does not rotate. Constant velocity can be maintained throughout the polishing pattern, so that a more uniform removal rate of material is attained. Finally, spinning of the wafer against the tooling head caused by continuous circular motion in one direction is minimized, since the arcs in the pattern are alternated between clockwise and counterclockwise rotational directions.

Figure 6:
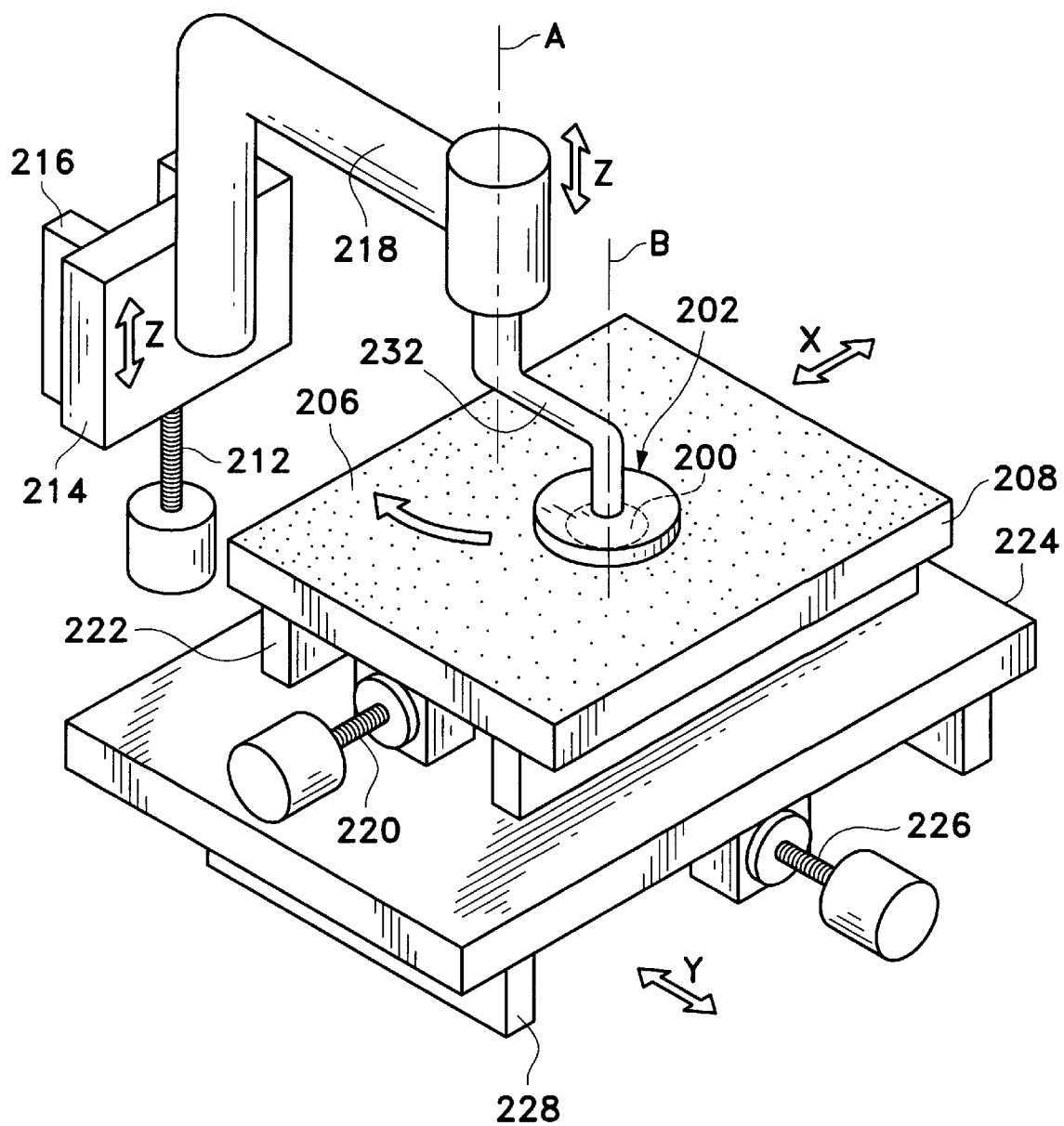
FIG. 6 is a front prospective view of a polishing apparatus with an eccentric arm, according to an alternative embodiment of the present invention.

FIG. 6 shows another embodiment of the present invention. In this variation, tooling head or wafer carrier 202 is connected to cross member 218 by eccentric arm 232. Eccentric arm 232 is rotatable about an axis "A" which is concentric with the upper portion of eccentric arm 232, so that tooling head 202 is moved in a circular path. Note that as in the previous embodiment abrasive pad 206 and table 208 are movable in the X and Y-directions by lead screws 220 and 226, and motion and force applied in the Z-direction are provided by lead screw 212.

According to this embodiment of the invention, the rotation of eccentric arm 232 is computer controlled, so that the user may precisely control the rotation speed. By rotating eccentric arm 232, tooling head 202 and wafer 200 are moved in a circular path about axis "A." If table 208 is also moved in the X and Y-directions, the resulting polishing pattern is that of a precessing circle. Unlike prior art systems which provide only straight-line precessing circles, this embodiment of the invention provides the user with unlimited precessing circle patterns. For example, the circular pattern may be made to precess in a larger circle or a sine wave pattern.

Figure 7A:
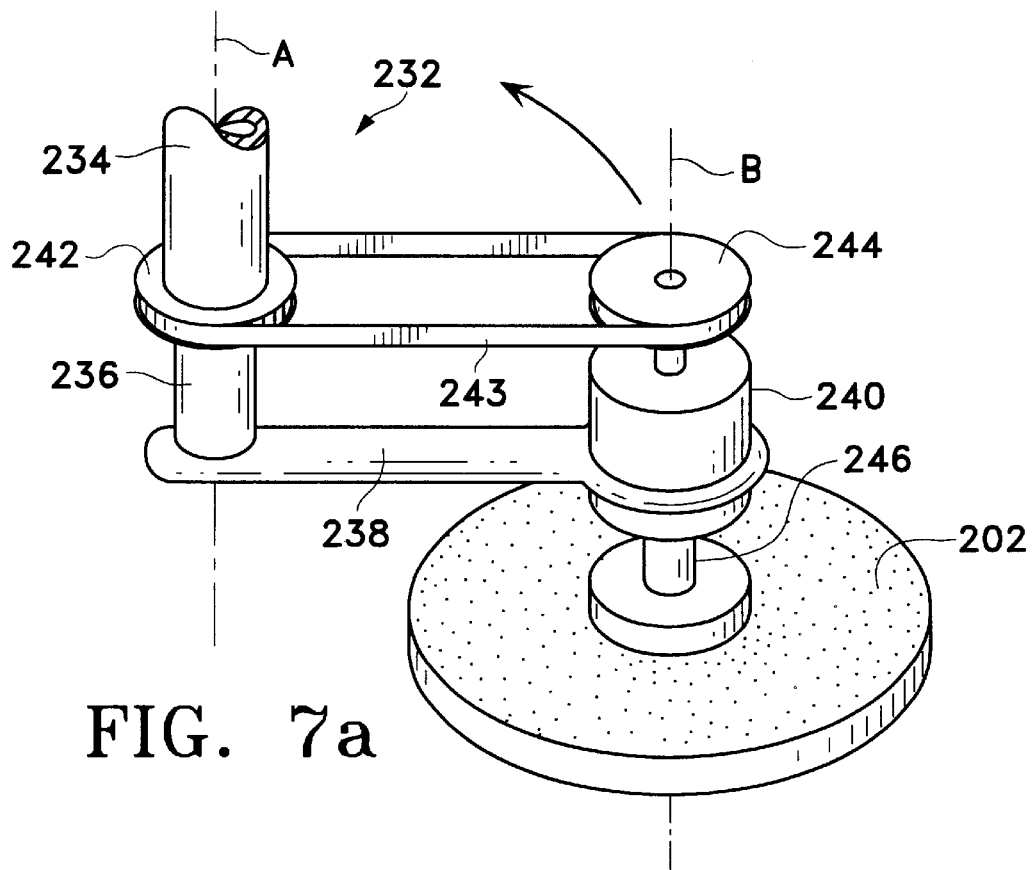
FIGS. 7a–b are front prospective views of non-rotation means of a polishing apparatus with an eccentric arm, according to the present invention.
Figure 7B:
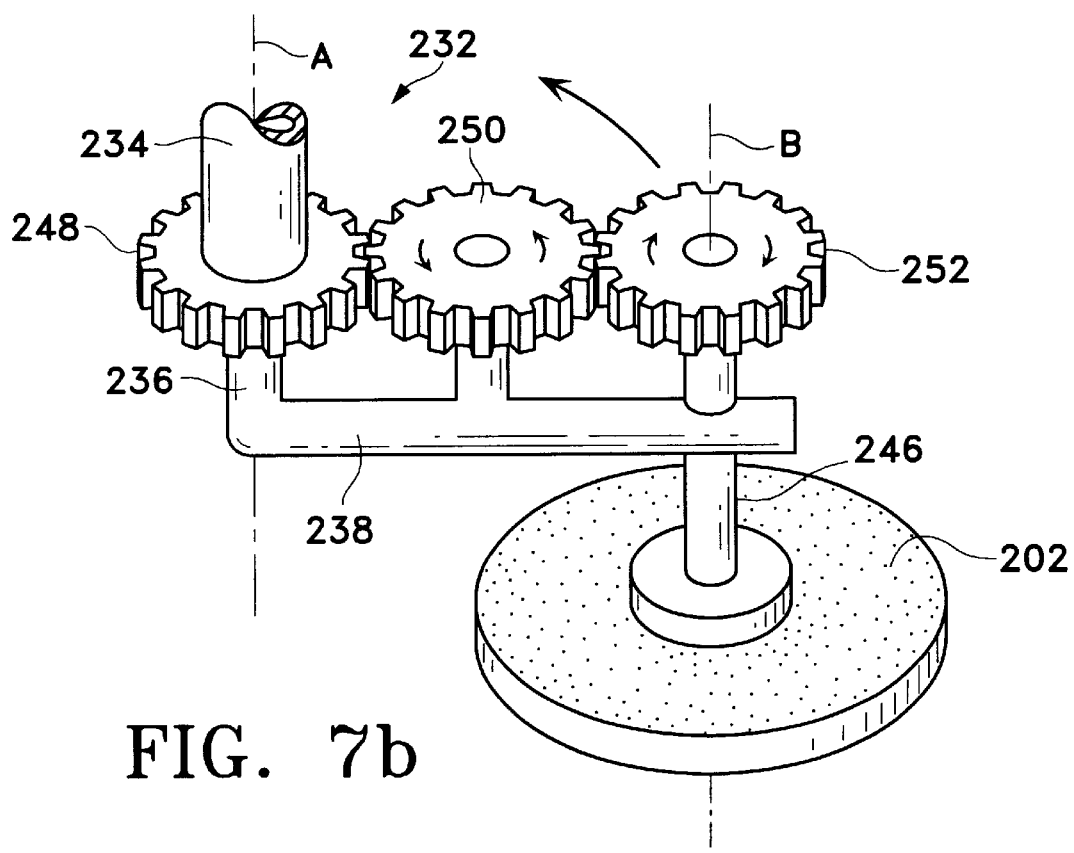

Preferably, tooling head 202 does not rotate about its own central axis "B." Instead tooling head 202 and wafer 200 translate in a circular path about axis "A." This translation without rotation results in uniform relative velocities attained at all points of the wafer. FIGS. 7a–b show two alternative embodiments of eccentric arm 232 and tooling head 202 which include structures to ensure that tooling head 202 does not rotate while tracking a circular path.

The structure shown in FIG. 7a uses a pulley and belt system to ensure non-rotation. Movement along the circular path is provided by a rotating vertical post 236, which rotates inside a non-rotating fixed vertical post 234 and protrudes as shown. Eccentric cross member 238 is connected to rotating vertical post 236 and spindle 240. Fixed pulley 242 is fastened to fixed vertical post 234. Belt 243 is engaged to both fixed pulley 242 and head pulley 244. Head pulley 244, in turn, is fastened to head post 246 which passes through and is supported by spindle 240 and is fastened to tooling head 202.

In operation, rotating vertical post 236 spins and causes eccentric arm 238, spindle 240, head post 246 and tooling head 202 to move in a circular path. Cooperation between fixed pulley 242, belt 243 and head pulley 244 ensures that tooling head 202 translates rather than rotates as it moves through its circular path.

FIG. 7b show another embodiment of eccentric arm 232 which uses a series of gears to ensure non-rotation of tooling head 202. As shown, fixed vertical post 234, rotating vertical post 236 and eccentric cross member 238 are provided in a fashion similar to the previous embodiment. In this embodiment, fixed gear 248 is fastened to fixed vertical post 234 and engages intermediate gear 250, which, in turn, engages head gear 252. Head gear 252 is fastened to head post 246. In operation, eccentric cross member 238 rotates about axis of rotation "A," while the series of gears 248, 250, and 252 ensure that neither fixed post 246 nor tooling head 202 rotate, but rather translate as they move in a circular motion about axis "A." Persons of ordinary skill in the art may select the appropriate gears or pulleys based on the length of arm 232 to achieve the effect as described herein.

Note that if a constant, non-fluctuating velocity between the wafer and the abrasive pad is desired, the rotation speed of eccentric arm 232 may be programmed accordingly. In order to compensate for the relative X and Y-direction motion of the table 208, the rotation speed of eccentric arm 232 may be programmed to keep the linear speed between the wafer and the abrasive pad at a constant value. Preferably, the eccentric arm should rotate at a slower speed when the motion of the head has a component which is opposite in direction to the table motion component and at a faster speed when the head motion has a component in the same direction as that of the table.

Figure 8:
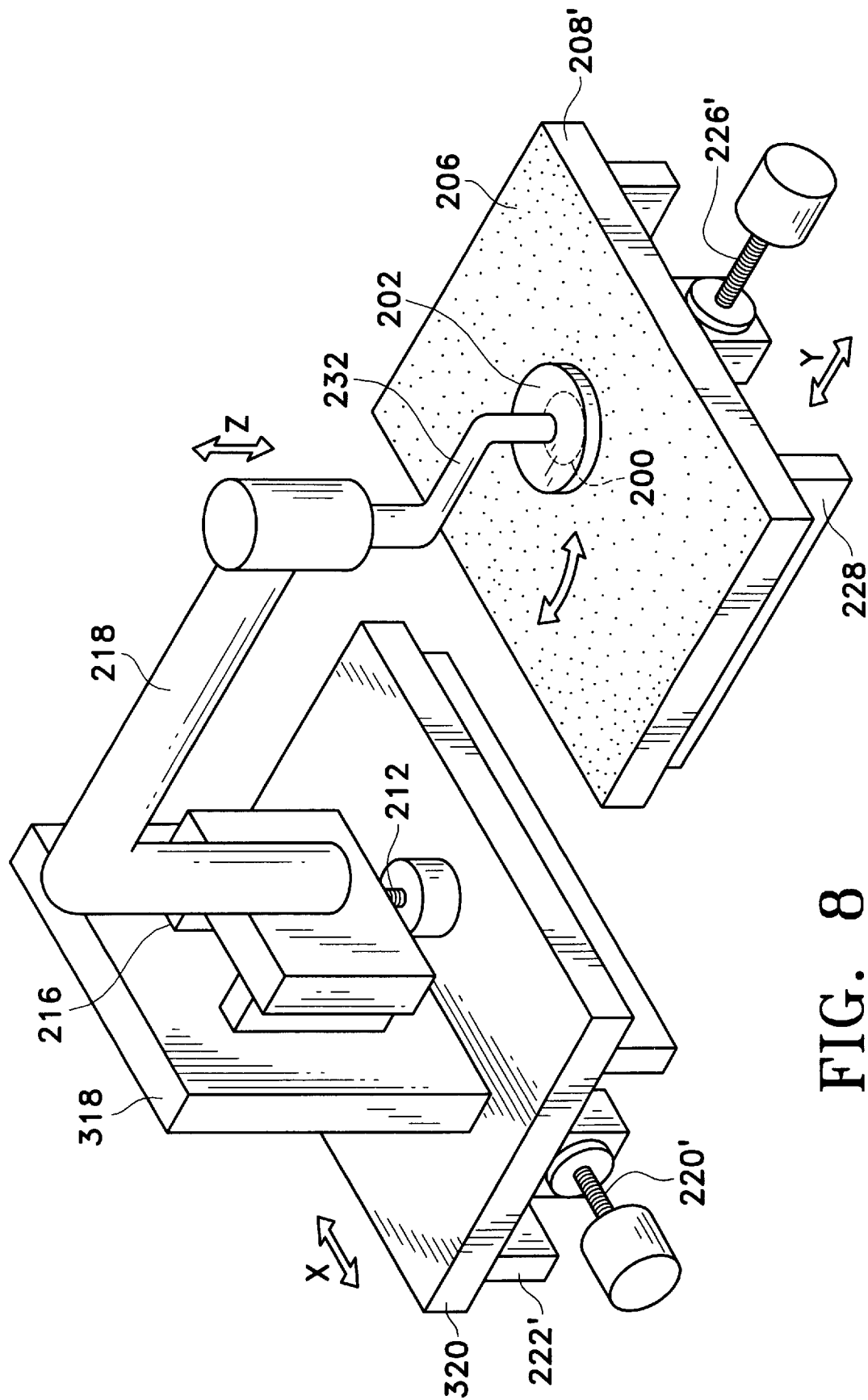
FIG. 8 is a front prospective view of another embodiment of a polishing apparatus according to the present invention.

FIG. 8 is a perspective view of another alternative embodiment according to the invention. In this embodiment abrasive pad 206 is mounted to table 208' which moves in the Y-direction by action of linear slide 228' and lead screw 226'. Wafer 200 is held by head 202 which is mounted on eccentric arm 232. Eccentric arm 232 is rotatably mounted to cross-member 218 which is fastened to plate 214. Under action of lead screw 212, plate 214 moves in the Z-direction. In this embodiment, linear slide 216 is slidably mounted to plate 318 which is fixedly mounted to plate 320. Plate 320 moves in the X-direction under action of lead screw 220' and linear slide 222'. Thus in this embodiment, head 202, arm 232, and cross-member 218 move in both the X and Z-directions, while the table 208' moves in the Y-direction. One skilled in the art would recognize that other embodiments are possible. For example, the table may remain stationary in the X and Y-directions, while the head moves in the X and Y-directions.

FIG. 9 is a cross-section side view of tooling head 202, according to one embodiment of the invention. As shown, post 204 is connected to shoulder 260 and provides motion and force in the Z-direction. Shoulder 260 is a solid cylindrical piece, and has a cylindrical guide ball socket 262 at its center which mates with guide ball 264. Guide ball 264 is securely fastened to platen 266 with a bolt or the like. As shown, wafer 200 is contacted by the underside of platen 266. Retaining lip 273 protrudes below the surface of platen 266 and serves to keep the wafer centered on the platen by contacting the edges of the wafer. Guide ball 264 and guide ball socket 262 provide accurate positioning of platen 266 and shoulder 260 in the X and Y-directions. Preferably guide ball 264 fits tightly into guide ball socket 262 such that guide ball 264 allows less than about 0.0002 inch of movement in the X and Y-directions.

Shoulder 260 also contains a circular notch 268 into which fit compression springs 270, which act between shoulder 260 and platen 266. In a preferred embodiment, springs 270 comprise a stack of circular Bellville springs that rest on platen 266. Springs 270 ensure that platen 266 is biased against the wafer and table so that the force in the Z-direction and thus pressure on the wafer can be varied. Therefore by varying the position of shoulder 260 and post 204 in the Z-direction, the pressure between wafer 200 and the abrasive pad may be accurately controlled.

Also shown in FIG. 9 is flexure ring 272, preferably a thin circular steel ring which is mounted to both the perimeter of shoulder 260 and a raised edge portion 267 of platen 266 using annular clamp rings 269 and 271 which are bolted to raised portion 267 and shoulder 260 respectively. Flexure ring 272 transmits cutting forces and torque between shoulder 260 and platen 266 in the X and Y-directions. Flexure ring 272 also allows relative motion in the Z-direction so that force can be transmitted to the wafer, and allows platen 266 to pivot slightly in the Z-direction about guide ball 264, as shown, in order to comply with slight variations in pad angle. However, flexure ring 272 does not allow rotation about the Z-axis. Advantageously, flexure ring 272 and guide ball 264 prevent platen 266 from moving in the X and Y-directions, so that there is no backlash, which can lead to undesirable chattering or vibration when using some polishing patterns.

Figure 10:
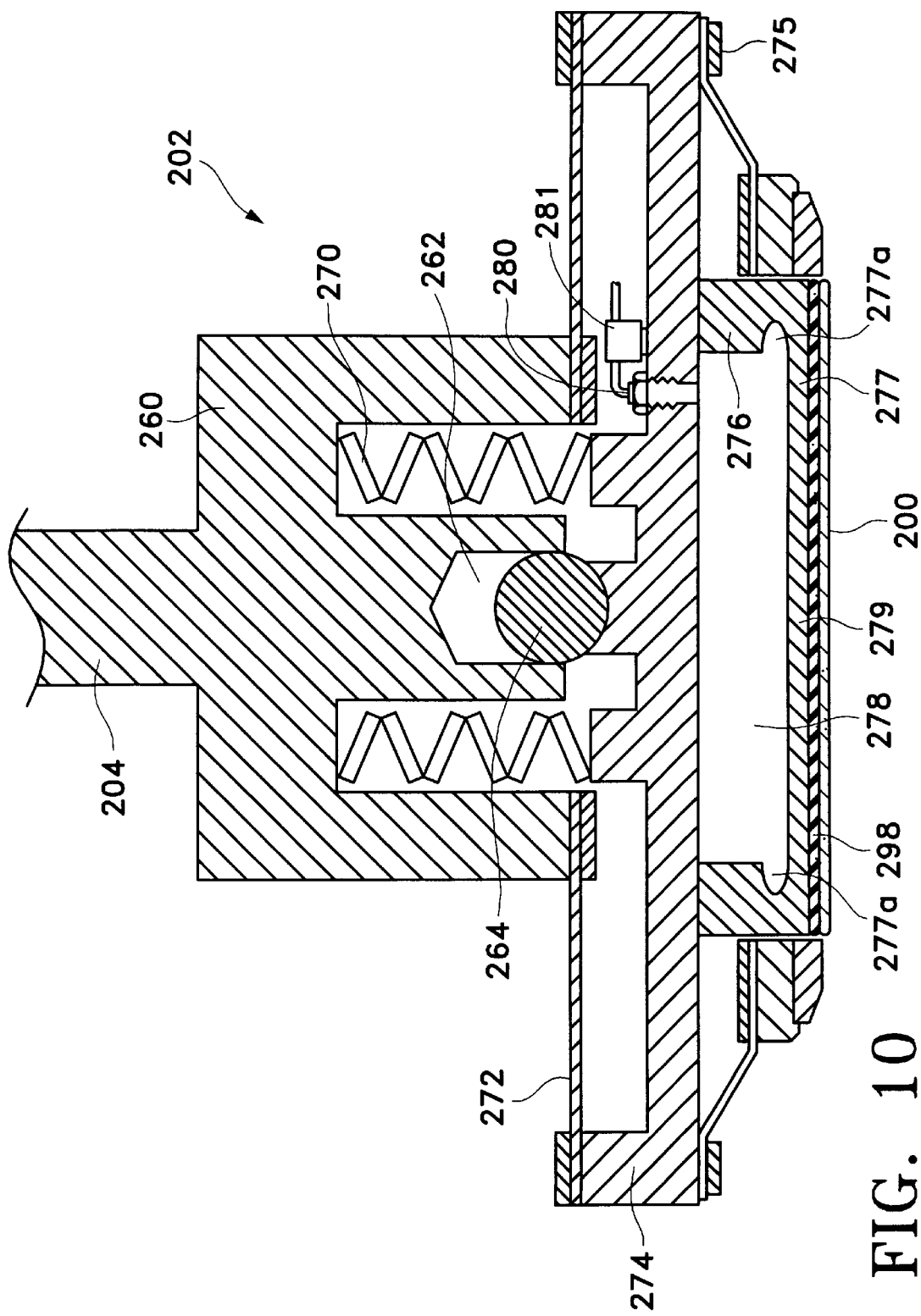
FIG. 10 is a sectional view of a tooling head according to another embodiment of the invention.
Figure 15A:
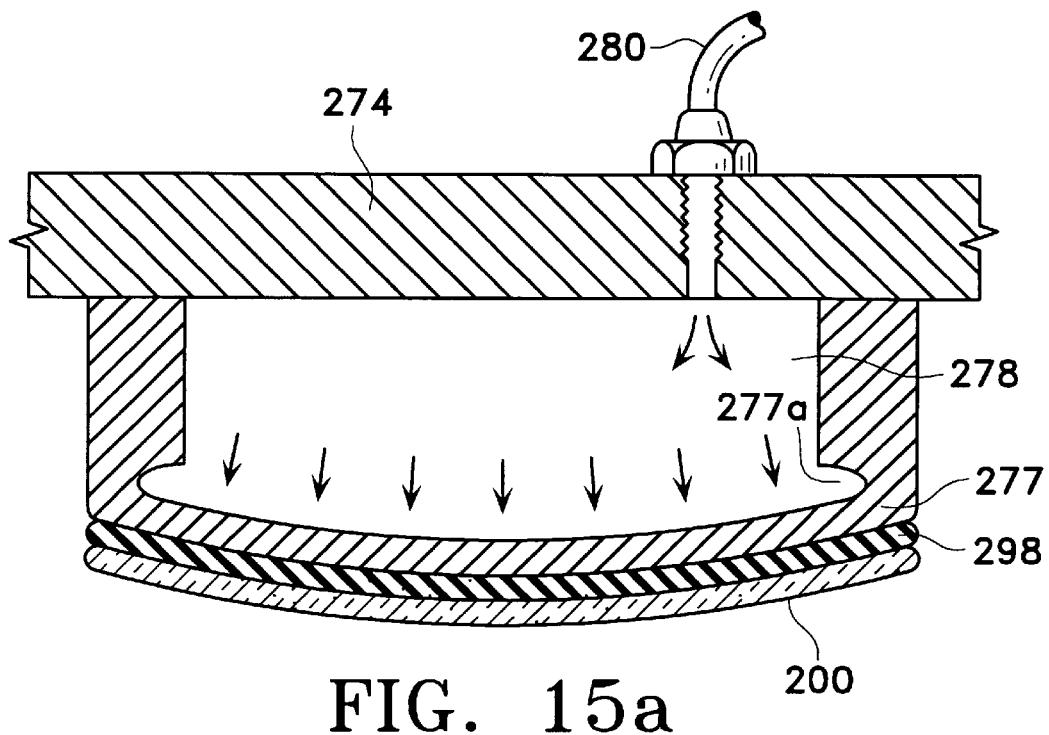
FIGS. 15a–b are side view cross-sections of a tooling head, illustrating the diaphragm action, according to the present invention.

FIG. 10 is a sectional view of a tooling head according to another embodiment of the invention. Wafer 200 is shown being held by tooling head 202. The rear side of wafer 200 is contacted by resilient pad 298, which preferably comprises an elastomer material, and acts as a spring between flexible platen 277 and wafer 200 and is compressible under force in the Z-direction. Flexible platen 277 comprises a thicker wall portion 276 and a thinner face portion 279. Platen 277 preferably consists of a metal material such as steel. The wall portion of platen 277 is attached to top plate 274, and cavity 278 is defined by the wall and face portions of platen 277 and top plate 274. Cavity 278 may be filled with gas or liquid to exert a positive or negative pressure on the face portion of platen 277 which acts as a diaphragm. Port 280 is provided to supply and drain gas or liquid from cavity 278. According to a preferred embodiment, an electronic computer controlled pressure regulator 281 is provided so that the pressure in cavity 278 is programmable and accurately controlled. By controlling the amount of fluid or gas in cavity 278, the face of platen 277 can be caused to flex into a concave or convex shape, thus advantageously changing the shape of the wafer 200 during polishing. Wall 276 and platen 277 join to form a "living hinge" or notch 277a. FIG. 15a shows the expandability of element 277a during convex flexing of the platen 277. Conversely, FIG. 15a shows a compression of the element 277a during concave flexing of the platen 277.

Figure 11:
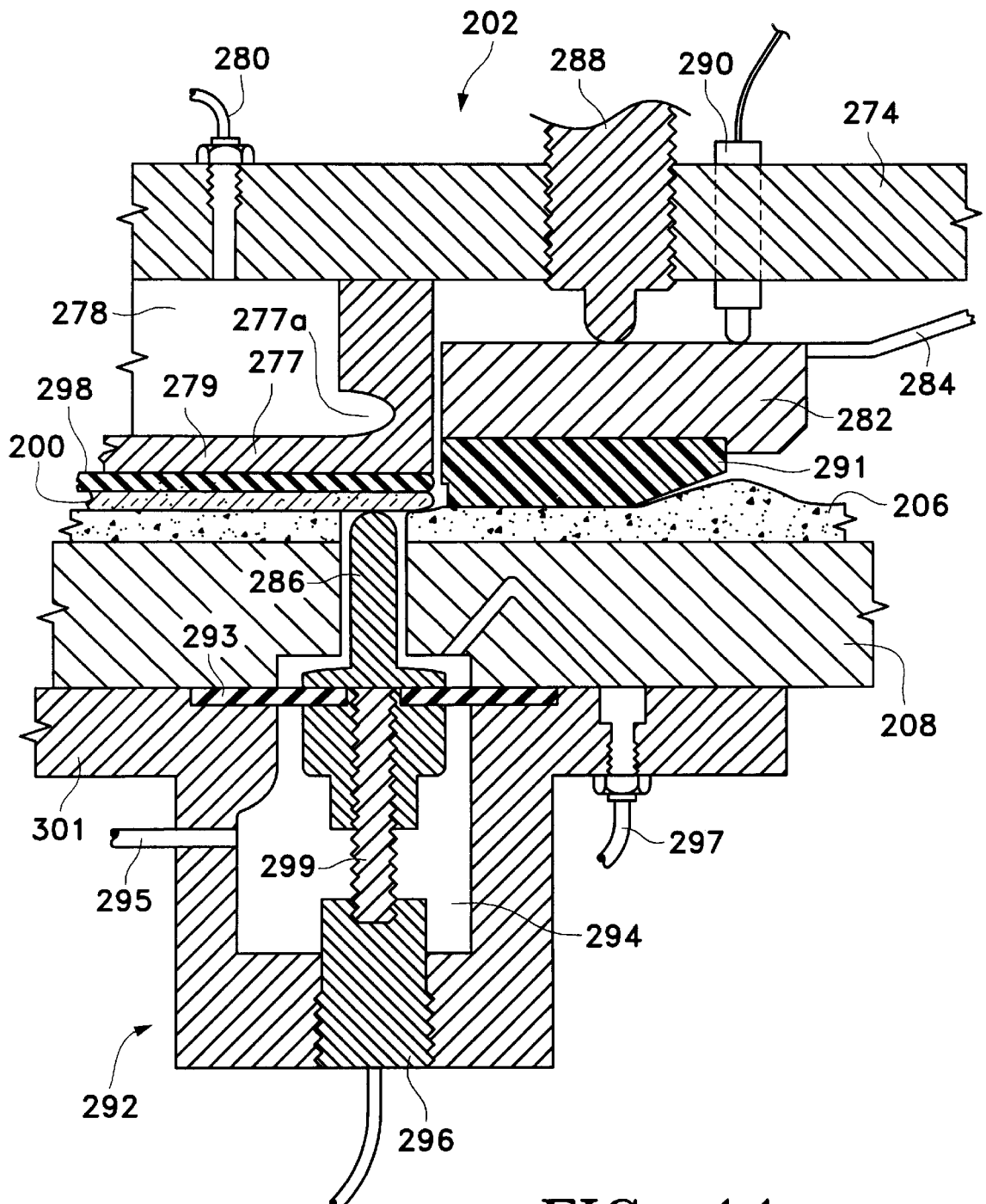
FIG. 11 is a partial sectional view of a tooling head, illustrating the area near the retention ring, according to the embodiment of FIG. 10.

FIG. 11 is a partial sectional view of a tooling head illustrating the area near the edge of the wafer, according to the embodiment described with respect to FIG. 10. As shown in FIG. 11, Wafer 200 is held in place by retention ring 282, which includes wear ring 291, and surrounds the perimeter of wafer 200. Note that retention ring 282 and plastic wear ring 291 have curved or cambered outer edges, which aid in flattening the abrasive pad during polishing, advantageously resulting in more uniform material removal from the wafer. Preferably, wear ring 291 comprises a plastic material having both high abrasion resistance to resist abrasion by the abrasive pad, and good dimensional stability to resist warpage. Retention ring 282 is flexibly attached to top plate 274 by retention ring flexure member 284. Retention ring flexure 284 comprises a flat circular steel band and is fastened to top plate 274 with clamp ring 275 which is bolted to top plate 274 (shown in FIG. 10). Flexure member 284 allows retention ring 282 to move in a vertical direction, which is substantially perpendicular to the plane of wafer 200. The exact vertical position of retention ring 282 is controlled by a number of servo-operated screws 288 and sensors 290, which are spaced along the perimeter of the tooling head. Sensors 290 measure the vertical height of retention ring 282 relative to top plate 274, and preferably send the information to a computer controller. The computer also controls the servo-operated screws 288, which set the vertical position of retention ring 282 during operation.

While the vertical position of retention ring 282 is adjustable, the screws 288 and flexure member 284 rigidly hold the ring in place and thus cannot be disturbed by variations in the process materials, such as "waves" and the like in abrasive pad 206. Retention ring 282 flattens out these variations which results in a more predictable and stable polishing process.

Table mounted sensor 292 is provided to measure the relative positions of wafer 200 and wear ring 291 during polishing. Table mounted sensor 292 comprises measuring pin 286, rubber diaphragm 293, sensor cavity 294, gas port 295, transducer 296, liquid port 297 and sensor housing 301. Measuring pin 286 has a rounded upper portion which protrudes above the surface of table 208 and into the region of abrasive pad 206. When the retention ring 282 and wafer 200 pass above table mounted sensor 292, measuring pin 286 comes in contact with and is depressed downward. Measuring pin 286 is movably linked to transducer 296 by threaded shaft 299. Transducer 296 is a linear voltage displacement transducer which transforms the linear motion of shaft 299 into a voltage analog signal.

Sensor cavity 294 is defined by the walls of sensor housing 301, the transducer, measuring pin, and rubber diaphragm. Gas port 295 provides means to control the gas pressure in sensor cavity 294. A positive pressure in cavity 294 serves to exert pressure on rubber diaphragm 293 causing the diaphragm to push measuring pin 286 upward. Thus, the vertical position of and upward spring force on measuring pin 286 may be controlled by the pressure of gas in the sensor cavity. Rubber diaphragm 293 also serves to seal sensor cavity 294 from the liquid environment on the surface of table 208. Liquid, such as water is pumped through liquid port 297, though the passageway and into area above the rubber diaphragm. During operation, the liquid from port 297 flushes this upper area of and generally keeps the area free from abrasive slurry.

Figure 12:
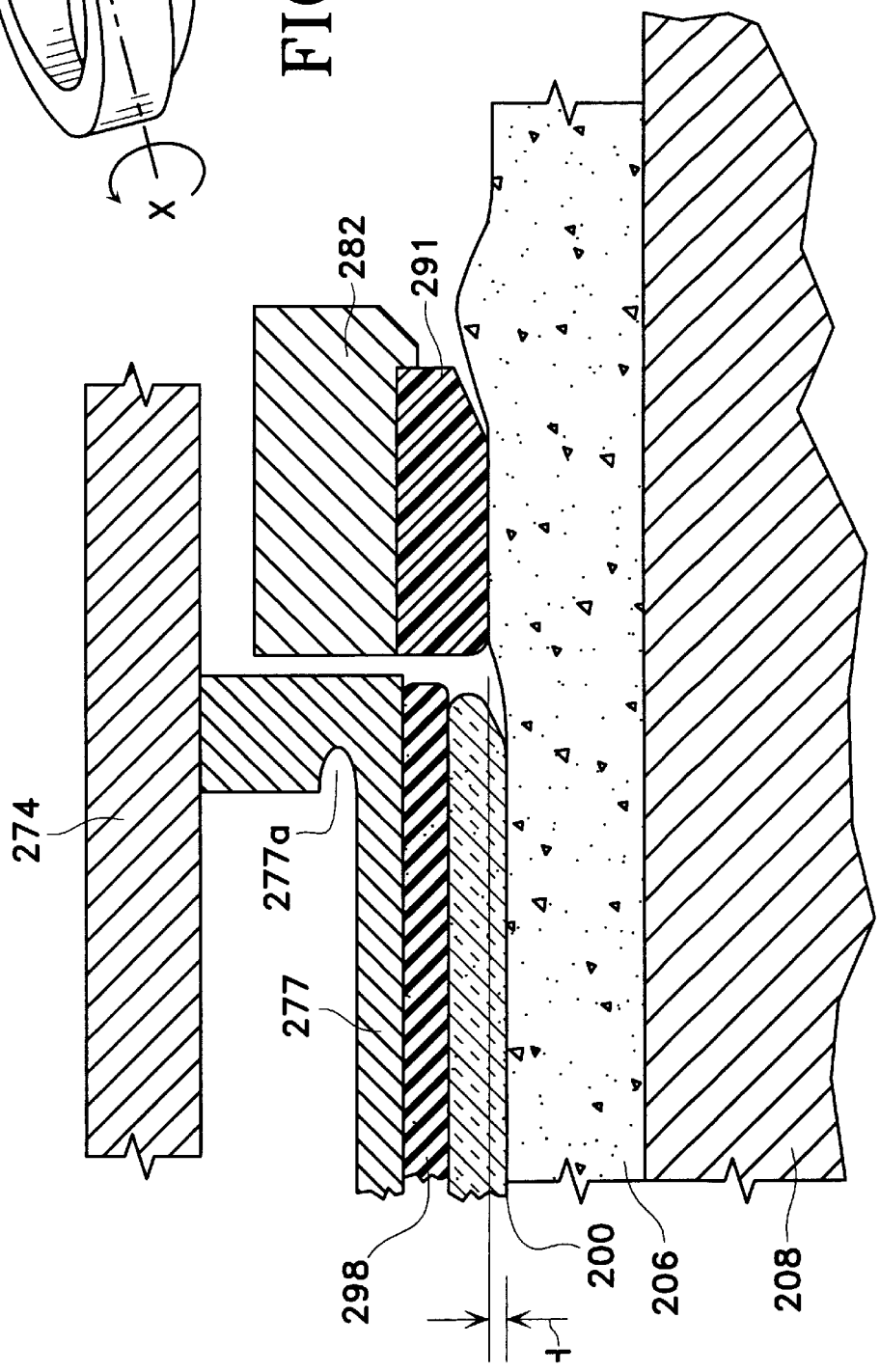
FIG. 12 is a partial sectional view of a tooling head, illustrating the area near the retention ring, according to the present invention.

Referring now to FIG. 12, a close-up cross section of the area near retention ring 282 is shown, including wear ring 291, flexible platen 277, resilient pad 298, wafer 200, abrasive pad 206 and table 208. Note that flexure member 284 and other structures are not shown. Also shown is height relationship H which is the difference in the vertical direction between wafer 200 and wear ring 291. During polishing, the height relationship H is an important parameter in ensuring even removal of material. Small changes in this relationship can have a measurable effect on uniformity. Even normal variations in wafer thickness if not compensated for can make process planarity difficult to control.

As mentioned, the vertical position of retention ring 282 is accurately controlled by manual operated or servo-operated screws. By controlling the height of retention ring 282 according to measurements taken by ring position sensors 290 and table mounted sensor 292, the height relationship H is fully adjustable. Advantageously, table mounted sensor 292 is capable of sensing the relative height of wafer 200 and retention ring 282 under loaded conditions before or during polishing. By measuring the relative position of the ring and the wafer under loaded conditions, factors such as the amount of compression of resilient pad 298 and abrasive pad 206 are taken into account.

Being able to adjust the relationship H between the height of wafer 200 and retention ring 282 advantageously allows control over the distribution of force applied between wafer 200 and wear ring 291. For example by increasing the height relationship H, more force will be exerted in the Z-direction on wafer 200 and less force will be exerted on wear ring 291. Note that when force is applied, resilient pad 298 acts as spring. By adjusting the height relationship H, the compression of resilient pad 298 is changed which in turn changes the distribution of pressure between the wafer and the retention ring.

Figure 13:
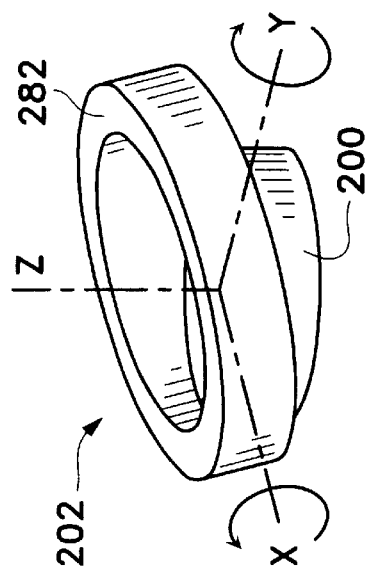
FIG. 13 is a front prospective view of a tooling head, illustrating the X and Y axes of rotation, according to the present invention.

According to a preferred embodiment of the invention, Retention ring 282 is also slightly rotatable about axes parallel to the plane of the wafer. This slight rotation is illustrated in FIG. 13, which is a much simplified view of wafer 200 and retention ring 282, not drawn to scale. FIG. 13 illustrates the relative rotational motion of retention ring 282 about two axes X and Y, both axes being parallel to wafer 200. For illustrative purposes, the relative position of retention ring 282 is greatly exaggerated. Note that in the present embodiment of the invention, servo operated screws 288 (shown in FIG. 11) are adjusted to position retention ring 282 as desired. Note further, that flexure member 284 allows retention ring 282 to rotate slightly about axes X and Y, and translate vertically in the Z-direction.

Figure 14:
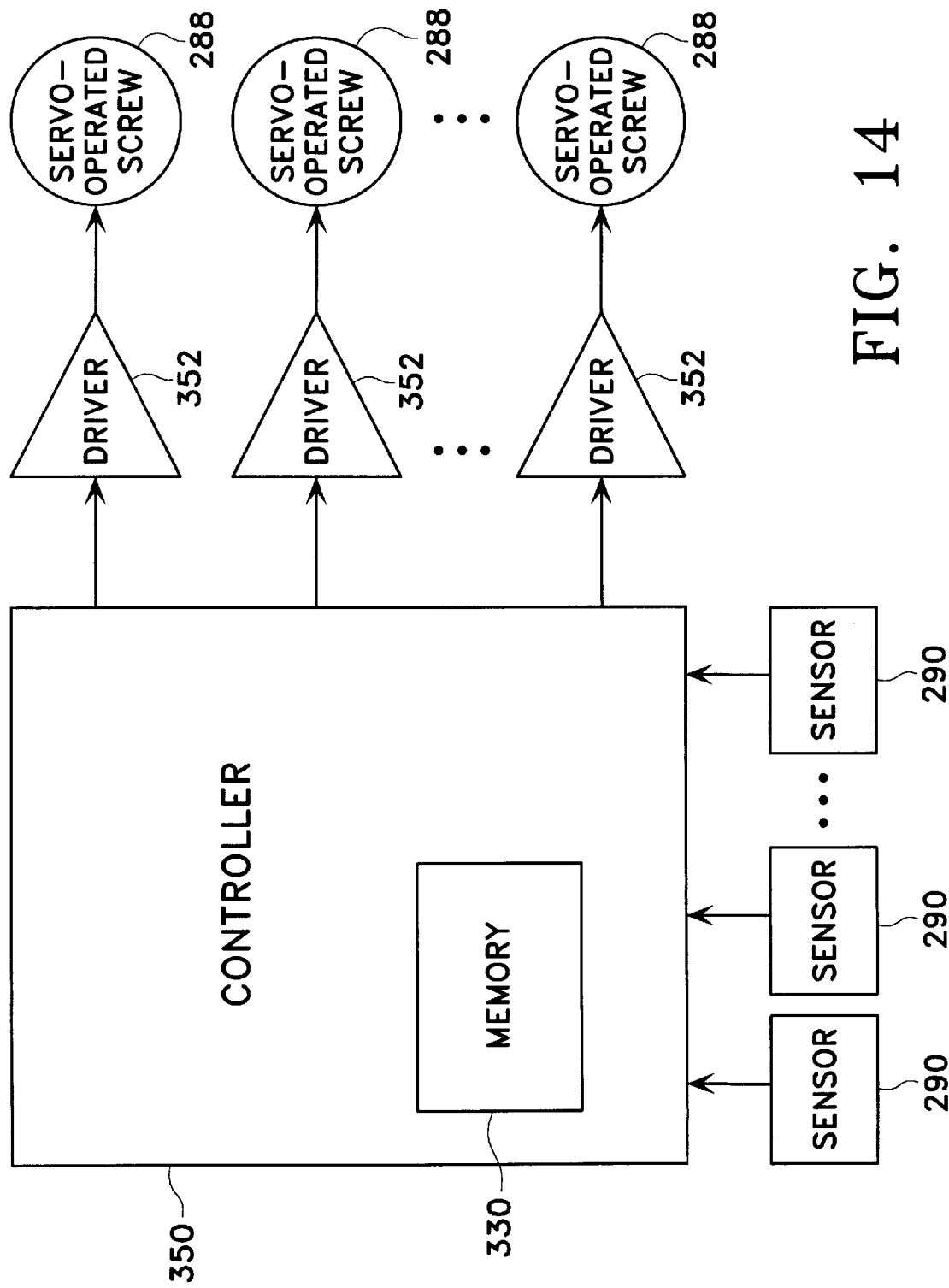
FIG. 14 is a block diagram illustrating control circuitry for controlling the retention ring according to a preferred embodiment of the present invention.

FIG. 14 is a block diagram illustrating control circuitry used to control the retention ring according to a preferred embodiment of the invention. Controller 350 correlates readings from the ring position sensors 290 of offsets in the Z-direction, and rotations of the ring about the X and Y axes. Controller 350 compares the desired retention ring position from memory 330 with the readings from ring position sensor and determines what if any change of position is required. The controller computes which screws must by actuated to attain the desired ring position. Controller 350 then sends control information reflecting any adjustments necessary to drivers 352 which drive servo-operated screws 288. In this way, the vertical position of the ring as well as the rotational position of the ring about the X and Y axes are precisely controlled and fully programmable. One of ordinary skill in the art may select the components needed for the described control circuitry from those currently commercially available.

By maintaining precise control over the position of the retention ring, the present invention provides the advantage of being able to fine tune the pressure distribution on the wafer in order to achieve a more uniform removal rate and surface finish on the wafer.

Figure 15B:
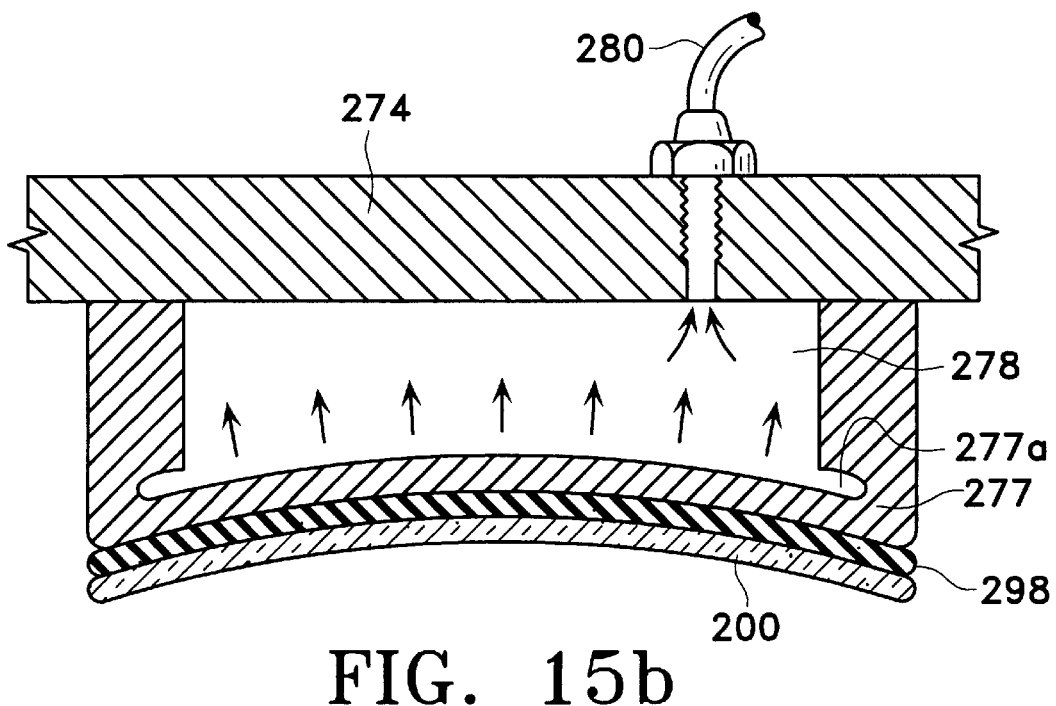

Referring now to FIGS. 15*a*–*b*, a more detailed description of the use of cavity 278 to change the contour of wafer 200 will be given. Note that the contours shown in FIGS. 15*a*–*b* are exaggerated to illustrate the relative shapes. As mentioned, gas or fluid may be supplied via port 280 which is preferably under control of a computer controlled electronic pressure regulator. As shown in FIG. 15*a*, when pressure builds in cavity 278, flexible platen 277 is forced into a convex position as shown, where the center portion of wafer 200 is lower than the edge portions. In contrast, FIG. 15*b* shows a concave contour which is caused by a vacuum or low pressure in cavity 278. By varying the pressure in cavity 278 using port 280 and the pressure regulator, the contour of platen 277 and wafer 200 may be advantageously programmed to range from highly convex to highly concave.

Figure 16A:
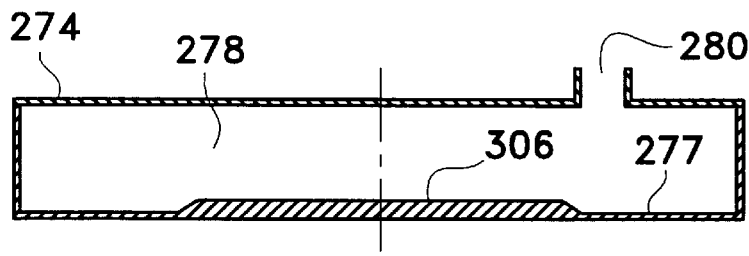
FIGS. 16a–f are side view cross-sections of the tooling head, illustrating the use of varying platen thickness and multiple chambers, according to the present invention.
Figure 16B:
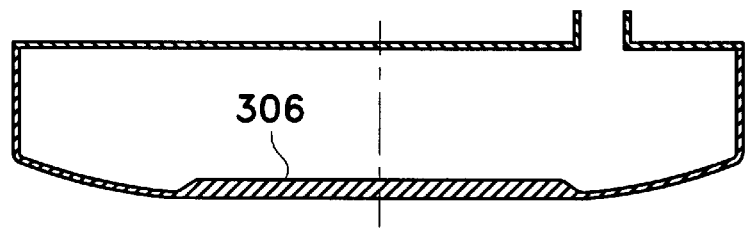
Figure 16C:
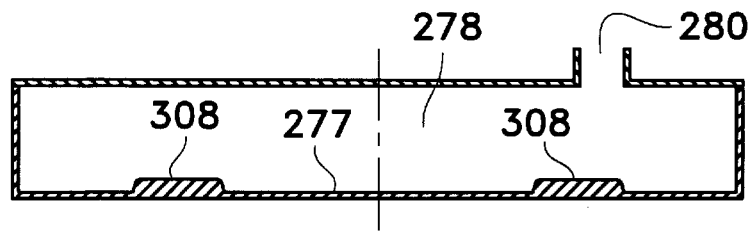
Figure 16D:
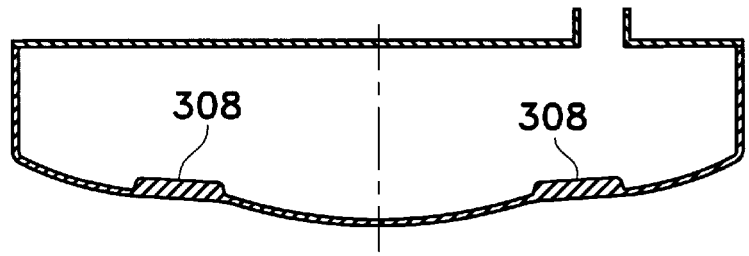

In FIGS. 16*a*–*f*, various embodiments of platen 277 and top plate 274, which allow for various contour shapes, are diagrammatically illustrated. In FIGS. 16*a*–*d*, the thickness of flexible platen 277 is varied to change the contour shape. In general, thicker portions of platen 277 will exhibit a lower curvature than thinner portions under the same pressure. In FIGS. 16*a*–*b* platen 277 comprises a thick center portion 306. FIG. 16*a* shows a flat contour due to ambient pressure in cavity 278, while FIG. 16*b* shows an convex contour due to high pressure in cavity 278. As shown in FIG. 16*b*, as a result of thick center portion 306, the center portion of platen 277 has relatively little curvature compared to regions away from the center which have greater curvatures. Shown in FIG. 16*c*–*d*, platen 277 comprises a thick portion 308 which is ring shaped. FIG. 16*c* shows a flat contour due to ambient pressure in cavity 278, while FIG. 16*d* shows, as a result of high pressure, zones of low curvature near thick portion 308 and zones of high curvature in other areas.

Figure 16E:
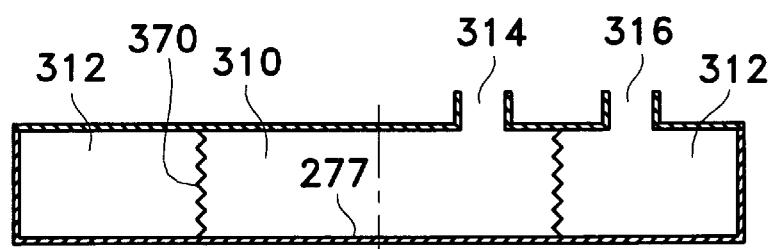
Figure 16F:
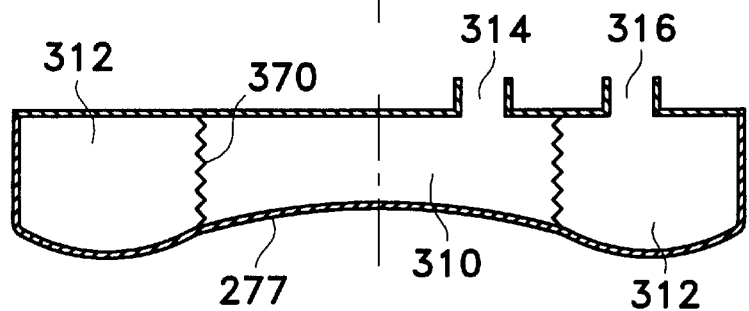

In FIGS. 16*e*–*f*, an alternative embodiment is shown wherein cavity 278 is divided into multiple chambers by membrane member 370 which forms a pressure tight seal between top plate 274 and platen 277. Thus, tooling head 202 comprises a center chamber 310 and a perimeter chamber 312. Each chamber has a separate port, see ports 314 and 316, and is separately pressurized or evacuated with fluid or gas. Shown in FIG. 16*f* is a contour resulting from a vacuum in center chamber 310 and high pressure in perimeter chamber 312. In this state, the center portion of platen 277 is concave while the outer portion is convex. One skilled in the art will recognize that other contour patterns are possible using different relative pressures in the chambers or different chambers altogether. For example the flexible platen 277 may be convex when there is no pressure in the cavity 278 and less convex when there is a vacuum in cavity 278.

Thus by providing a platen having non-uniform thickness, or providing multiple cavities or chambers, according to the present invention, a user may advantageously change the contour of a wafer being polished, and the removal rate may advantageously be more precisely controlled.

Note that although the two features just described, the operation and control of retention ring 282, and the operation and control of deformable platen 277 and cavity 278, have been described in conjunction with one another, one of ordinary skill in the art will recognize that either one may be practiced independently of the other. In other words, the adjustable retention ring will operate with a conventional platen, and a deformable platen will operate with a conventional retaining lip.

The embodiments of this invention described above are illustrative only of the principles of this invention and are not intended to limit the invention to the embodiments described herein. In view of this disclosure, those skilled in the art can utilize this invention in a wide variety of applications. For example, one skilled in the art will recognize that the present invention may be used for polishing other disk-shaped objects.

We claim:

1. A wafer polishing apparatus, comprising:
   a table defining a planar polishing surface adapted to contain a polishing medium;
   a wafer carrier assembly adapted to hold a wafer against the polishing surface, said wafer carrier assembly including a wafer carrier and means for preventing rotation of said wafer carrier about any axis perpendicular to said polishing surface; and
   means for providing relative movement between said wafer carrier and said polishing surface in any direction within the plane of said polishing surface.

2. The apparatus according to claim 1, wherein said table is movable in any direction within the plane of the polishing surface.

3. The apparatus according to claim 2, wherein said means for providing relative movement comprises a first slide mechanism coupled to the table to move the table in a first direction within the plane of said polishing surface, and a second slide mechanism coupled to the table to move the table in a second direction within the plane of said polishing surface and perpendicular to said first direction.

4. The apparatus according to claim 3, wherein said first and second slide mechanisms each comprise a linear slide coupled to a lead screw rotatably driven by a motor.

5. The apparatus according to claim 4, further comprising:
   a controller communicating with said first and second slide mechanisms; and
   means for programming said controller with a predetermined polishing pattern, said controller controlling the motion of said first and second slide mechanisms according to said predetermined polishing pattern.

6. The apparatus according to claim 1, wherein said wafer carrier assembly is movable in directions along a first axis within a plane parallel to the plane of the polishing surface.

7. The apparatus according to claim 6, wherein said means for providing relative movement comprises at least one slide mechanism coupled to said wafer carrier assembly to move said wafer carrier assembly in directions along said first axis.

8. The apparatus according to claim 7, further comprising:
   a controller communicating with said at least one slide mechanism; and
   means for programming said controller with a predetermined polishing pattern, said controller controlling the motion of said at least one slide mechanism according to said predetermined polishing pattern.

9. The apparatus according to claim 1, wherein said means for preventing rotation comprises one or more pulleys mounted on an eccentric arm and coupled to a belt to prevent rotation of said wafer carrier about any axis perpendicular to said polishing surface.

10. The apparatus according to claim 1, wherein said means for preventing rotation comprises a plurality of gears mounted on an eccentric arm, said gears coupled to each other to prevent rotation of said wafer carrier about any axis perpendicular to said polishing surface.

11. The apparatus of claim 1 wherein said wafer carrier assembly further comprises:
   a post member;
   a platen having a face dimensioned and oriented to contact a face of the wafer during polishing; and
   a flexible disk fixedly mounted between said post member and said platen, said flexible disk transmitting torsional forces between the platen and the post member to substantially prevent rotation as between the platen and post member, while permitting vertical movement of the platen with respect to the post.

12. The apparatus according to claim 11, wherein said wafer carrier assembly further comprises a spring assembly mounted between said post and said platen and configured to apply force on said platen in directions perpendicular to the face of the platen in response to movement by said post member in directions perpendicular to the face of the platen.

13. The apparatus according to claim 1, wherein the wafer carrier assembly further comprises:
   a circular platen having a face adapted to contact the wafer; and
   a ring peripherally oriented about the outer edge of the platen and mounted to the platen, said ring mounted and positioned to resist forces on the wafer in directions parallel to the face of the wafer.

14. The apparatus according to claim 13, wherein said wafer carrier assembly further comprises an adjustable coupling mounted between the platen and the ring adapted to adjustably position at least one of the height and angular tilt of the ring relative to the face of the wafer and to rigidly support during polishing the position of the retaining ring.

15. The apparatus according to claim 1 wherein said wafer carrier assembly comprises:
   a fluid sealed cavity defined by:
   a top plate member;
   at least one wall member mounted to said top plate and surrounding said cavity; and
   a deformable platen mounted to said wall member opposite the top plate, said platen having a face opposite the cavity for contacting a face of the wafer;
   wherein said cavity may be alternately pressurized or evacuated to deform said face of said platen into a substantially non-planar shape.

16. The apparatus of claim 15 further comprising a membrane member defining a second cavity with said top plate wall members and said deformable platen.

17. The apparatus of claim 15 wherein the thickness of said deformable platen is varied.

18. An apparatus for polishing a face of a semiconductor wafer comprising:
   a base member;
   a table having an upper surface, said table movably mounted to said base member;
   a polishing medium fixedly attached to the surface of said table;
   a table moving mechanism for moving said table in directions parallel to the surface of the table;
   a controller communicating with said table moving mechanism, said controller controlling the motion of said table according to a polishing pattern consisting of a continuous series of arcs;
   a circular platen having a face adapted to contact the wafer during polishing, said face oriented substantially parallel to the surface of the table;
   a ring peripherally oriented about the outer edge of the platen and mounted to the platen, said ring mounted and positioned to resist lateral forces on the wafer caused by engagement of the face of the wafer with the polishing surface;
   an adjustable coupling mounted to the platen and the ring, said coupling adapted to adjustably position the height of the ring relative to the face of the wafer and to rigidly support during polishing the position of the retaining ring;
   a post member movably attached to the platen and to said base member, said post member having an axis substantially perpendicular to the face of the platen; and
   a flexible disk fixedly mounted to said post member and to said platen, said flexible disk oriented substantially parallel to the face of said platen, adapted to prevent rotation of the platen about said axis of said post member and to transmit forces between the platen and the post member in directions parallel to said face of said platen.

19. The apparatus of claim 18, wherein said table moving mechanism comprises a first slide mechanism adapted to move the table in a first direction parallel to the surface of said table, and a second slide mechanism adapted to move the table in a second direction which is parallel to the surface of said table and perpendicular to said first direction.

20. The apparatus of claim 19, wherein said first and second slide mechanisms each comprise a linear slide coupled to a lead screw rotatably driven by a motor.

21. The apparatus of claim 19, further comprising:
   a controller communicating with said first and second slide mechanisms; and
   means for programming said controller with a predetermined polishing pattern, said controller controlling the motion of said first and second slide mechanisms according to said predetermined polishing pattern.

22. The apparatus of claim 21 wherein said (predetermined) polishing pattern maintains a constant relative velocity between the surface of the table and the face of the wafer.

23. The apparatus of claim 21 wherein said (predetermined) polishing pattern comprises a series of arcs.

24. The apparatus of claim 21 wherein said (predetermined) polishing pattern comprises a continuous arc polishing pattern.

25. A wafer polishing apparatus comprising:

a table defining a planar polishing surface;

a wafer carrier assembly adapted to hold a wafer against said polishing surface, said wafer carrier assembly including a base, a wafer carrier, and a linkage connecting said wafer carrier to said base, said linkage preventing rotation of said wafer carrier with respect to any axis perpendicular to said planar polishing surface; and a driver assembly connected to at least one of said table and said wafer carrier assembly to effect relative movement between said table and said wafer carrier assembly in any direction within the plane of said polishing surface.

* * * * *